(12) United States Patent
Uto

(10) Patent No.: US 7,934,354 B2
(45) Date of Patent: May 3, 2011

(54) DOOR PANEL

(75) Inventor: Ryoji Uto, Tokyo (JP)

(73) Assignee: Caterpillar S.A.R.L., Geneva (CH)

( * ) Notice: Subject to any disclaimer, the term of this patent is extended or adjusted under 35 U.S.C. 154(b) by 72 days.

(21) Appl. No.: 12/444,740

(22) PCT Filed: Jul. 15, 2008

(86) PCT No.: PCT/JP2008/062738
§ 371 (c)(1),
(2), (4) Date: Apr. 8, 2009

(87) PCT Pub. No.: WO2009/041149
PCT Pub. Date: Apr. 2, 2009

(65) Prior Publication Data
US 2010/0095634 A1    Apr. 22, 2010

(30) Foreign Application Priority Data
Sep. 27, 2007    (JP) .................................. 2007-252533

(51) Int. Cl.
*E06B 3/70* (2006.01)
*B62D 25/10* (2006.01)

(52) U.S. Cl. .................. 52/784.1; 52/784.13; 52/784.15; 52/794.1; 296/146.5; 296/146.6; 244/129.5; 114/117

(58) Field of Classification Search ................. 52/309.9, 52/784.1, 784.12, 784.13, 784.15, 794.1; 49/502; 89/36.08; 109/64, 76; 428/71, 213, 428/215, 216; 244/129.5; 114/117; 296/146.5, 296/146.6, 187.1; 29/897.32
See application file for complete search history.

(56) References Cited

U.S. PATENT DOCUMENTS

| | | | | |
|---|---|---|---|---|
| 1,915,940 A | * | 6/1933 | McKee | 52/788.1 |
| 2,670,820 A | * | 3/1954 | Worthington | 34/201 |
| 2,787,030 A | * | 4/1957 | Williams | 49/317 |
| 2,787,345 A | * | 4/1957 | Soubier et al. | 52/232 |
| 2,839,793 A | * | 6/1958 | Fields | 52/784.15 |
| 3,070,196 A | * | 12/1962 | Switzgable, Jr. | 52/404.4 |
| 3,121,264 A | * | 2/1964 | Hammar | 52/784.15 |
| 3,196,763 A | * | 7/1965 | Rushton | 404/21 |
| 3,217,455 A | * | 11/1965 | Burges | 52/404.2 |
| 3,868,796 A | * | 3/1975 | Bush | 52/783.12 |
| 3,909,919 A | * | 10/1975 | Miyabayashi et al. | 29/521 |

(Continued)

FOREIGN PATENT DOCUMENTS

JP        48002361        1/1973

(Continued)

*Primary Examiner* — Robert J Canfield
(74) *Attorney, Agent, or Firm* — McDermott Will & Emery LLP

(57) ABSTRACT

A door panel that is light in weight and has sufficient strength is provided. A door panel has an outer panel, an inner panel, and a foamed material filling a space between the outer panel and the inner panel. The inner panel is formed by means of press molding so as to have an uneven surface with adhering portions and a raised portion. The adhering portions are affixed to the inner surface of the outer panel, and the space is formed between the raised portion and the outer panel. The outer panel has a thickness ranging from 1.2 to 5.0 times that of the inner panel. A hemmed portion is formed by folding the peripheral edge of the outer panel so as to curl over the peripheral edge of the inner panel and then pressing down the folded part.

4 Claims, 20 Drawing Sheets

U.S. PATENT DOCUMENTS

| | | | | |
|---|---|---|---|---|
| 3,949,529 A * | 4/1976 | Porter | | 52/281 |
| 4,037,006 A * | 7/1977 | Roberts et al. | | 428/71 |
| 4,104,840 A * | 8/1978 | Heintz et al. | | 52/309.9 |
| 4,161,567 A * | 7/1979 | Sturgeon | | 428/594 |
| 4,351,558 A * | 9/1982 | Mueller | | 296/203.01 |
| 4,411,121 A * | 10/1983 | Blacklin et al. | | 52/789.1 |
| 5,435,108 A * | 7/1995 | Overholt et al. | | 52/309.11 |
| 5,531,500 A * | 7/1996 | Podvin | | 296/152 |
| 5,626,382 A * | 5/1997 | Johnson et al. | | 296/146.7 |
| 5,667,868 A * | 9/1997 | Freeman | | 428/120 |
| 5,704,107 A * | 1/1998 | Schmidt et al. | | 29/460 |
| 5,709,053 A * | 1/1998 | Kuroda | | 52/145 |
| 5,722,213 A * | 3/1998 | Morency | | 52/784.11 |
| 5,787,677 A * | 8/1998 | Bolich et al. | | 52/784.15 |
| 5,941,624 A * | 8/1999 | Pfeffer et al. | | 312/405.1 |
| 6,044,604 A * | 4/2000 | Clayton et al. | | 52/309.9 |
| 6,052,887 A * | 4/2000 | Dziadosz et al. | | 29/509 |
| 6,635,328 B2 * | 10/2003 | Shimabara et al. | | 428/71 |
| 6,899,157 B2 * | 5/2005 | Mullet | | 160/235 |
| 7,051,490 B2 * | 5/2006 | Oishi et al. | | 52/784.15 |
| 7,790,076 B2 * | 9/2010 | Seiter et al. | | 264/41 |
| 2002/0066258 A1 * | 6/2002 | Oishi et al. | | 52/784.15 |
| 2004/0211122 A1 * | 10/2004 | Freymuth et al. | | 49/502 |
| 2005/0242529 A1 * | 11/2005 | Kim et al. | | 277/628 |
| 2006/0033357 A1 * | 2/2006 | Karuppaswamy et al. | | 296/146.6 |
| 2007/0145767 A1 * | 6/2007 | Saitoh et al. | | 296/146.5 |
| 2008/0289547 A1 * | 11/2008 | Wakamatsu et al. | | 109/76 |
| 2009/0282760 A1 * | 11/2009 | Sampson et al. | | 52/232 |
| 2010/0031604 A1 * | 2/2010 | Nakajima et al. | | 52/784.1 |
| 2010/0048122 A1 * | 2/2010 | Uto et al. | | 454/195 |
| 2010/0077667 A1 * | 4/2010 | Uto et al. | | 49/381 |

FOREIGN PATENT DOCUMENTS

| | | | |
|---|---|---|---|
| JP | 62-134328 | * | 6/1987 |
| JP | 09228412 | | 9/1997 |
| JP | 3457804 | | 8/2003 |
| JP | 2003226926 | | 8/2003 |

* cited by examiner

---

DOOR PANEL

CROSS REFERENCED TO RELATED APPLICATION

The present application is the U.S. national phase of International Patent Application No. PCT/JP2008/062738, filed Jul. 15, 2008, which claims the benefit of Japanese Patent Application No. 2007-252533, filed Sep. 27, 2007, both of which are hereby incorporated by reference in their entireties.

TECHNICAL FIELD

The present invention relates to a door panel that is provided with an outer panel and an inner panel.

BACKGROUND OF THE INVENTION

FIG. 28 illustrates a hydraulic excavator 10, which is a work machine. The hydraulic excavator 10 includes a lower structure 11, an upper structure 12, a cab 13, a work equipment 14, and a power system 15 that includes an engine. The cab 13, the work equipment 14, and the power system 15 are mounted on the upper structure 12, which is rotatably mounted on the lower structure 11. The power system 15 is covered by a top cover 16, side doors 17,18, and other such components. The side doors 17,18 are mounted by hinges, which will be explained later, so as to be capable of opening and closing, and secured in the closed state by means of a latching device 19.

A conventional door that comprises a set of two metal panels and is used in the field of automobile technology, typically has a structure with a hemmed outer panel, in other words, the outer panel so folded as to curl over the peripheral edge of the inner panel. Therefore, the outer panel, which curls over the inner panel, is usually thinner than the inner panel. However, should this structure be applied to the door panel of a side door 17 or 18 of a work machine, the door panel becomes too weak to withstand an impact from the outside.

Cover units exist with such a structure that includes an outer panel of a work machine folded to curl over the peripheral edge of an inner panel. The outer panel is formed of a plate material having the same thickness as that of the inner panel (e. g. See Japanese Laid-open Patent Publication No. 9-228412 (page 3, and FIGS. 7 and 8) ("JP '412")).

Various examples also exist of an engine cover of a work machine with a lining that is a sound insulating material or a sound absorbing material attached to the inner side of the cover body of the engine cover (e. g. See Japanese Patent No. 3457804 (page 2, and FIG. 1) ("JP '804").

A cover unit disclosed in JP '412 has an outer panel and an inner panel that are of the same thickness. Therefore, should both panels be made thinner in order to make the cover unit compact, the panels are easily dented by an external impact. On the other hand, making both panels thicker in order to prevent this problem presents the difficulty of increased weight and costs.

The engine cover disclosed in JP '804 requires that sufficient strength be provided by the cover body alone. This requirement not only makes the cover body heavier but also presents the difficulty of ensuring sufficient strength.

In order to solve the above problems, an object of the invention is to provide a door panel that is light in weight and has sufficient strength.

SUMMARY OF THE PRESENT INVENTION

The present invention relates to a door panel including an outer panel; an inner panel that is thinner than the outer panel and affixed to the inner surface of the outer panel so that a space is formed between the outer panel and the inner panel; and a foamed material filling the space between the outer panel and the inner panel.

Also according to the present invention, the inner panel of the door panel of the present invention includes a recessed adhering portion that is joined to the inner surface of the outer panel, and a raised portion bulging from the adhering portion.

The door panel of the present invention includes a hemmed portion formed by folding the peripheral edge of the outer panel so as to curl over the peripheral edge of the inner panel and then pressing down the folded part.

According to the present invention, the outer panel of the door panel according to any one of the above embodiments of the present invention has a thickness ranging from 1.2 to 5.0 times that of the inner panel.

According to the present invention, the outer panel and the inner panel of the door panel are formed by using a galvanized steel sheet.

According to the present invention, the inner panel of the door panel includes a reinforcing deformed portion formed adjacent to the adhering portion that is formed at a location corresponding to the hemmed portion of the outer panel and adapted to be bonded, by means of an adhesive, to the outer panel so that the reinforcing deformed portion rises from a location close to the hemmed portion of the outer panel.

In the present invention, the hollow structure with a closed cross section formed of the outer panel and the inner panel, which is thinner than the outer panel, can make the entire door panel lighter. Furthermore, as the closed cross section of this hollow structure has sufficient height, being formed of the inner panel and the outer panel with a thickness greater than that of the inner panel, the door panel has sufficient strength against an external impact. Therefore, a door panel that is light in weight and has sufficient strength can be provided at inexpensive cost. Furthermore, the foamed material is capable of effectively damping sound generated from the door panel itself and, consequently, provides high damping effect to reduce noise.

According to the present invention, the inner panel includes a recessed adhering portion and a raised portion bulging from the adhering portion. Therefore, because of the uneven surface structure formed of the adhering portion and the raised portion, the inner panel has increased rigidity and, consequently, increased strength, in spite of being thinner than the outer panel.

The hemmed portion is formed by folding the peripheral edge of the outer panel so as to curl over the peripheral edge of the inner panel and then pressing down the folded part. Therefore, even with the outer panel that is thicker than the inner panel, the invention is capable of providing a hemmed portion with a uniform shape, and thereby providing a folded joint portion having stable quality.

According to the present invention, the outer panel has a thickness ranging from 1.2 to 5.0 times that of the inner panel, thereby ensuring sufficient strength against an external impact.

According to the present invention, anti-corrosion properties of the interior of the door panel can be improved by forming the outer panel and the inner panel by using a galvanized steel sheet.

According to of the present invention, a bulky reinforcing deformed portion like a column or beam is formed so as to protrude from a location close to the hemmed portion of the outer panel, which has substantial strength, it is possible to minimize the area where two panels are bonded together by means of an adhesive and not made into a thick structure, such as the area of the adhering portion that is free from the hemmed portion. As a result, it is possible to minimize deformation caused by shrinkage of the adhesive or change in temperature. Furthermore, this structure is also capable of ensuring accuracy in the shape by preventing warping of the edge of the door panel.

DETAILED DESCRIPTION OF THE INVENTION

Figure 20:
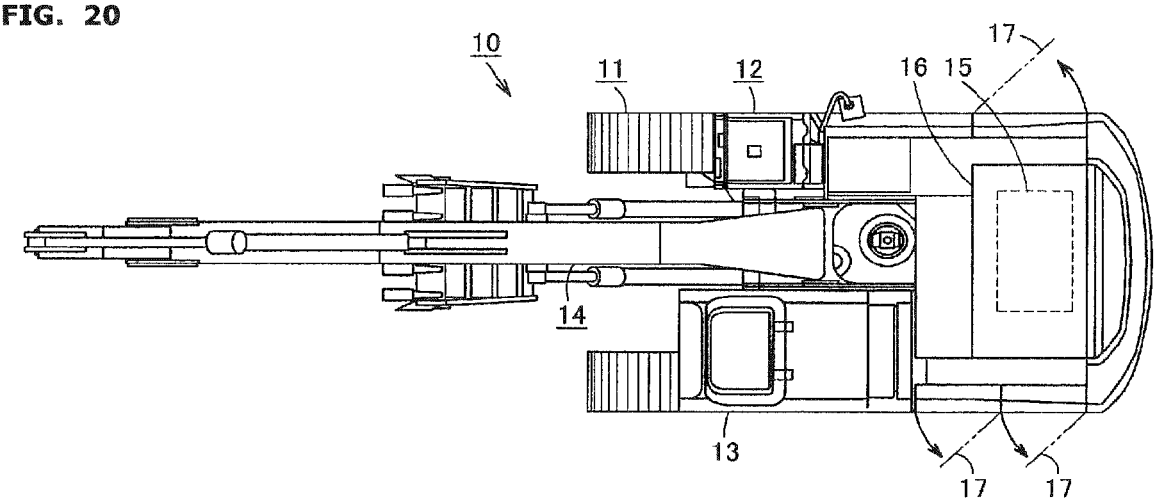
FIG. 20 is a plan view of a work machine provided with the door panel.
Figure 21:
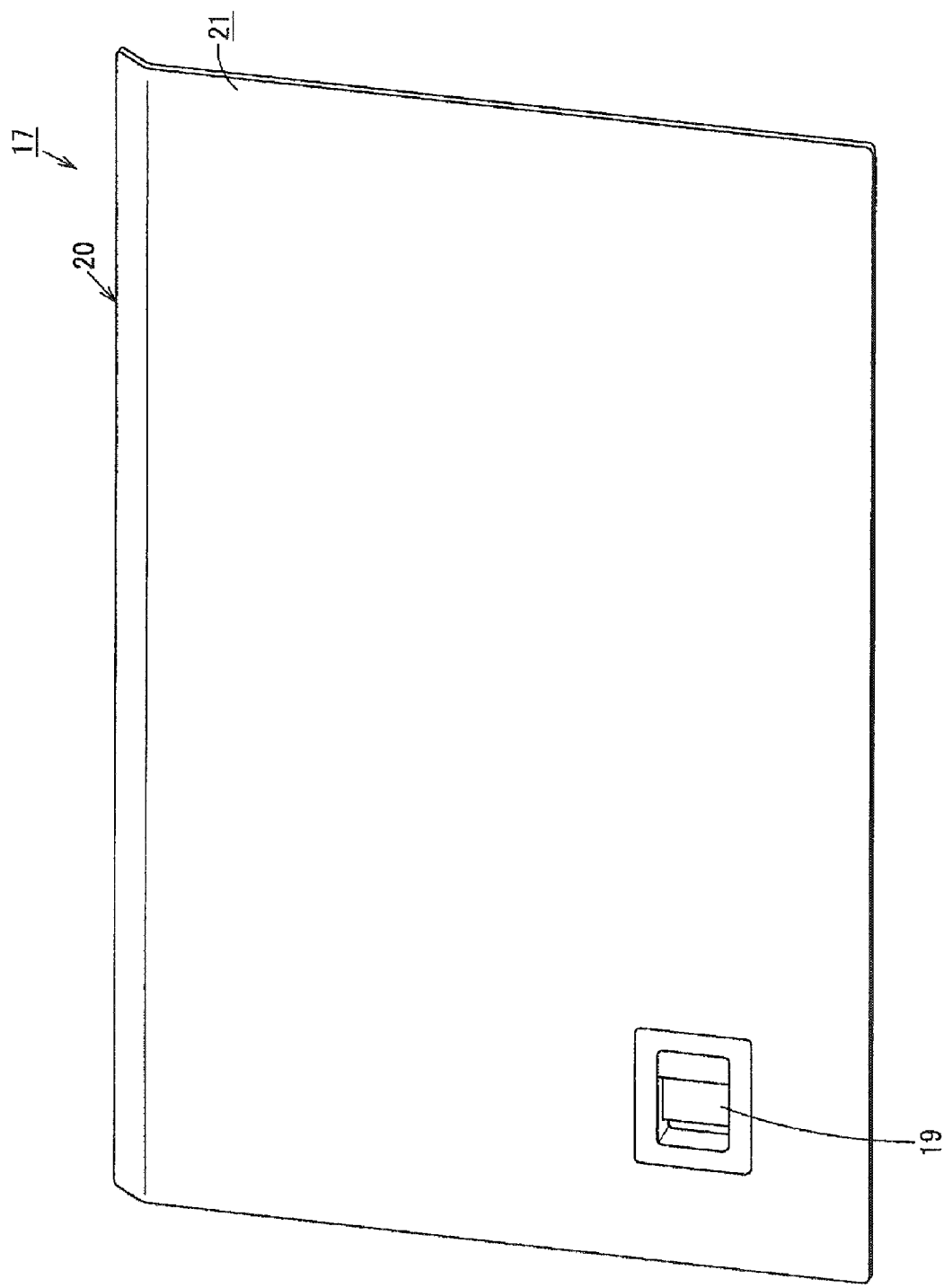
FIG. 21 is a perspective view of the outer face of a door panel according to another embodiment of the present invention.
Figure 22:
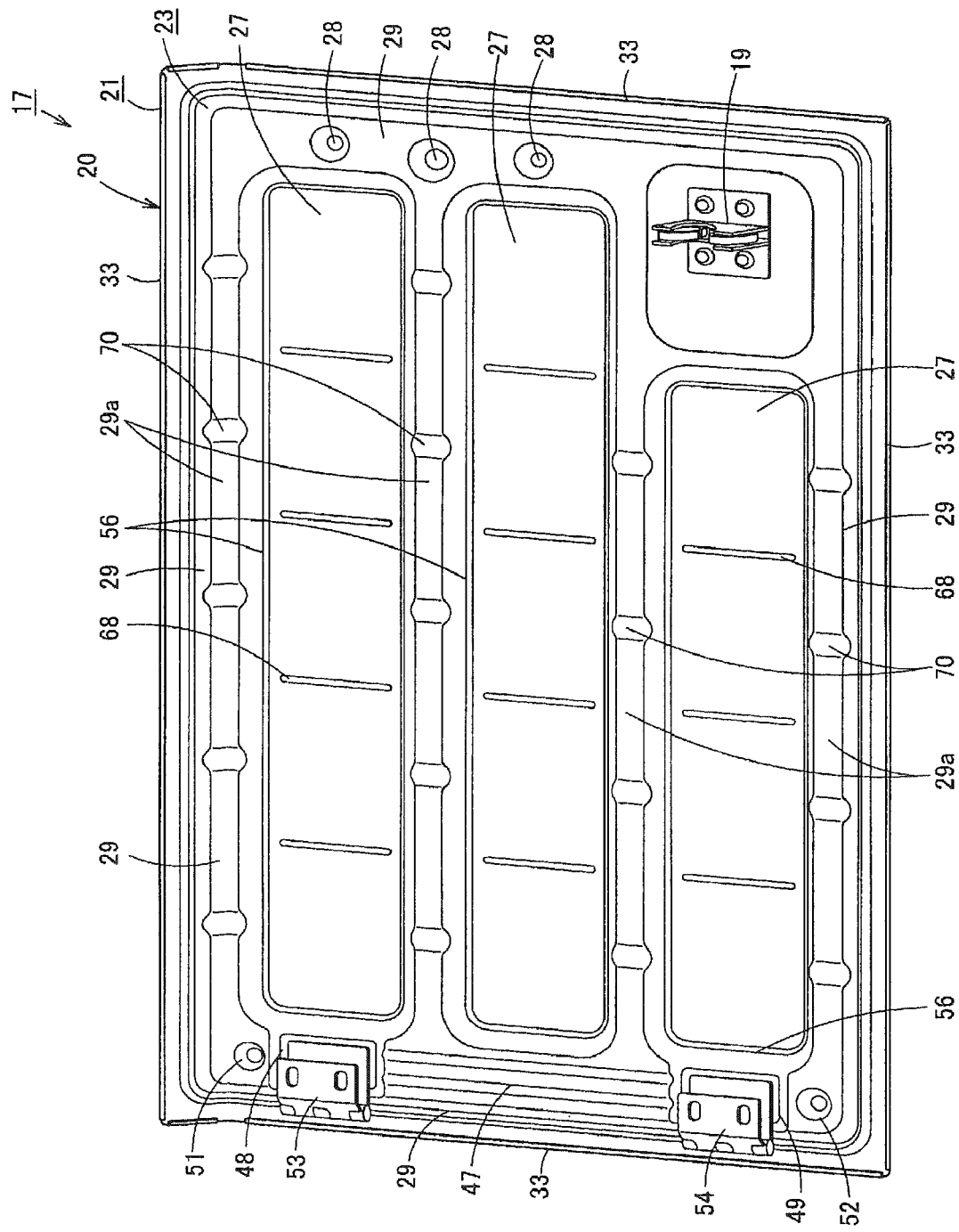
FIG. 22 is a perspective view of the inner face of the door panel.
Figure 23:
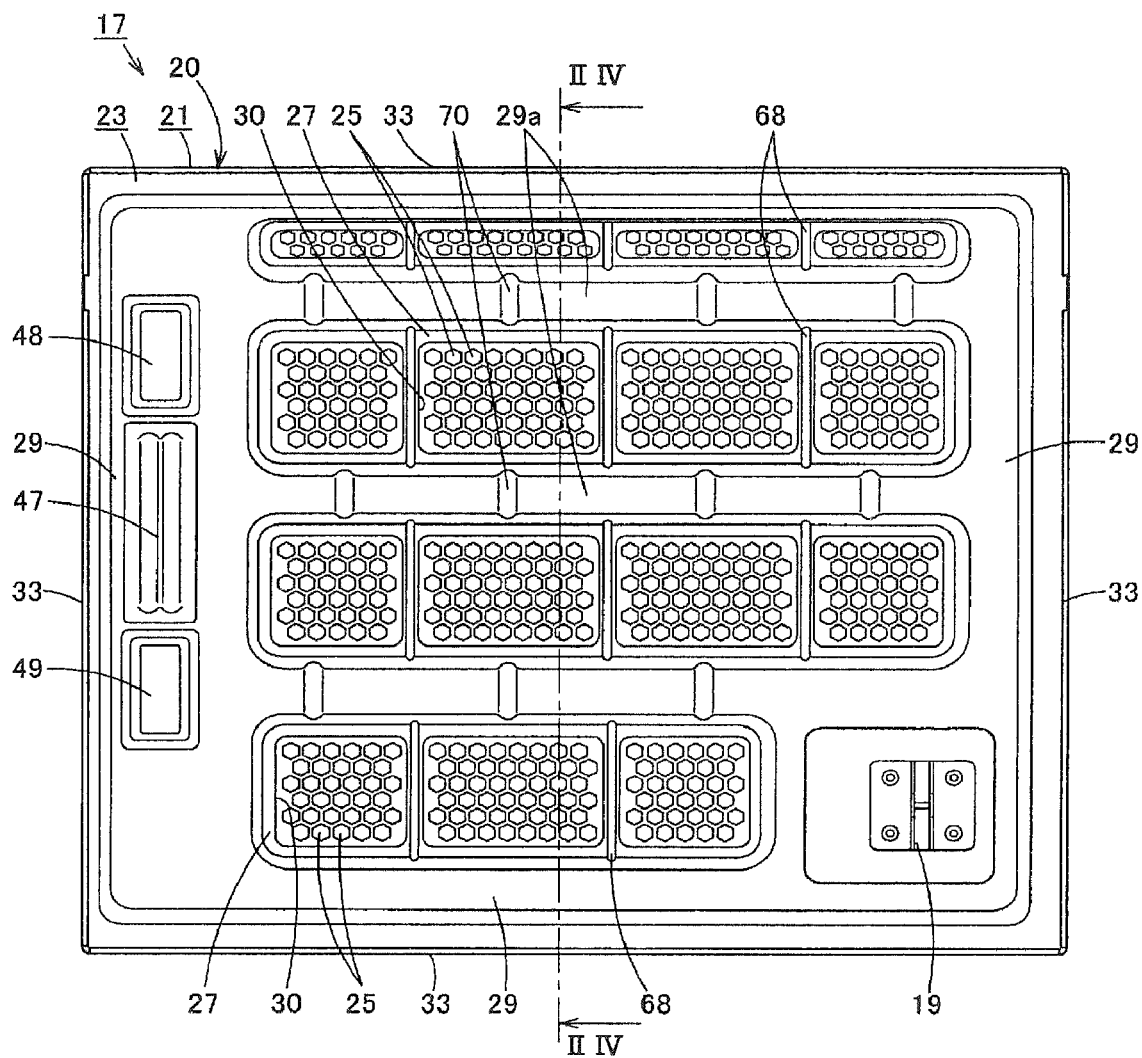
FIG. 23 is an internal view of a door panel according to a further embodiment of the present invention.
Figure 24:
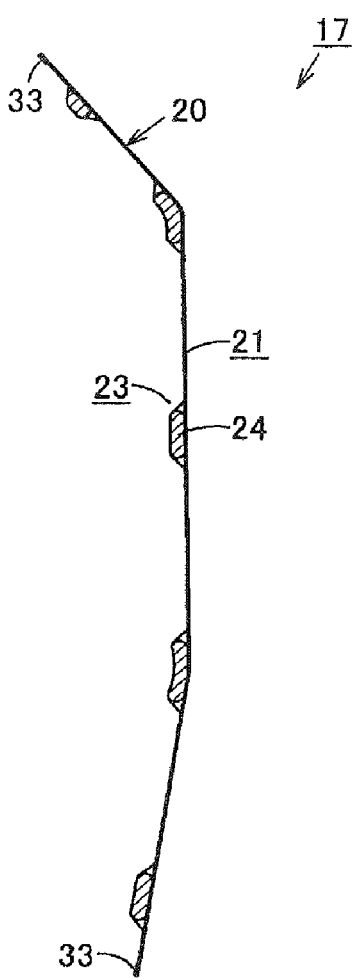
FIG. 24 is a sectional view taken along the line IIIV-IIIV of FIG. 23.
Figure 25:
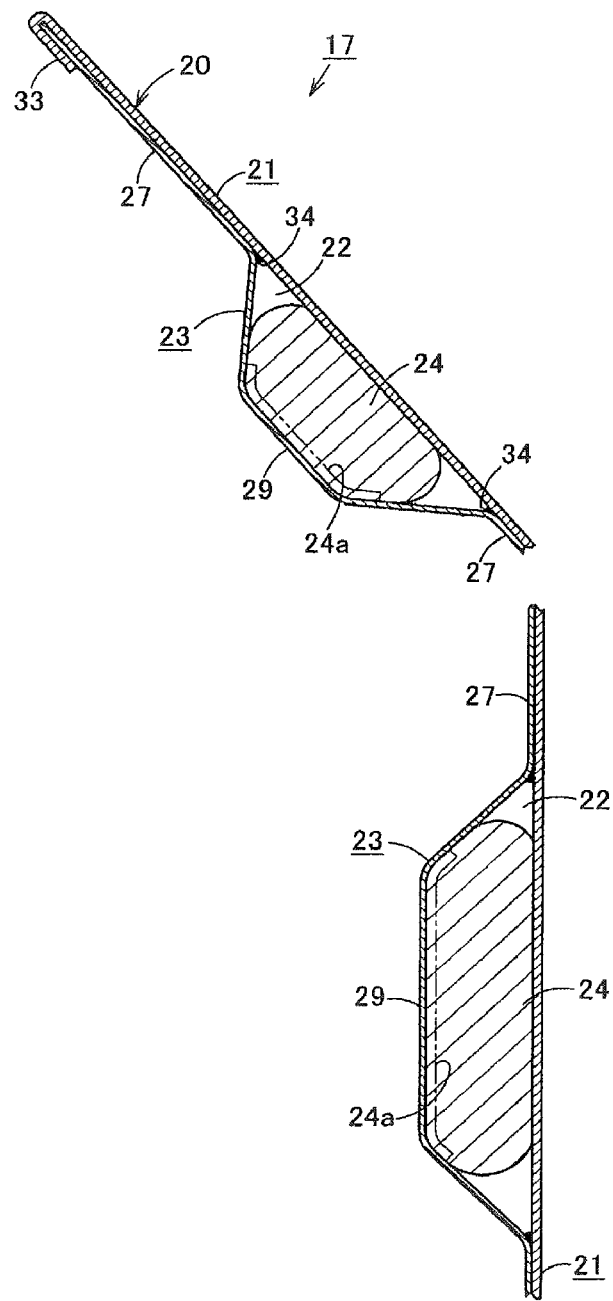
FIG. 25 is an enlarged sectional view of FIG. 24.
Figure 26:
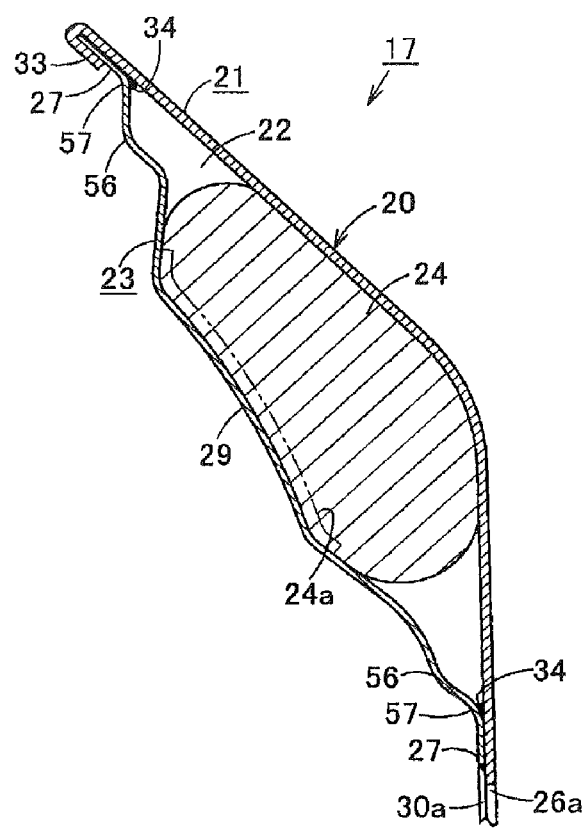
FIG. 26 is a sectional view of a door panel according to an embodiment of the present invention.
Figure 27:
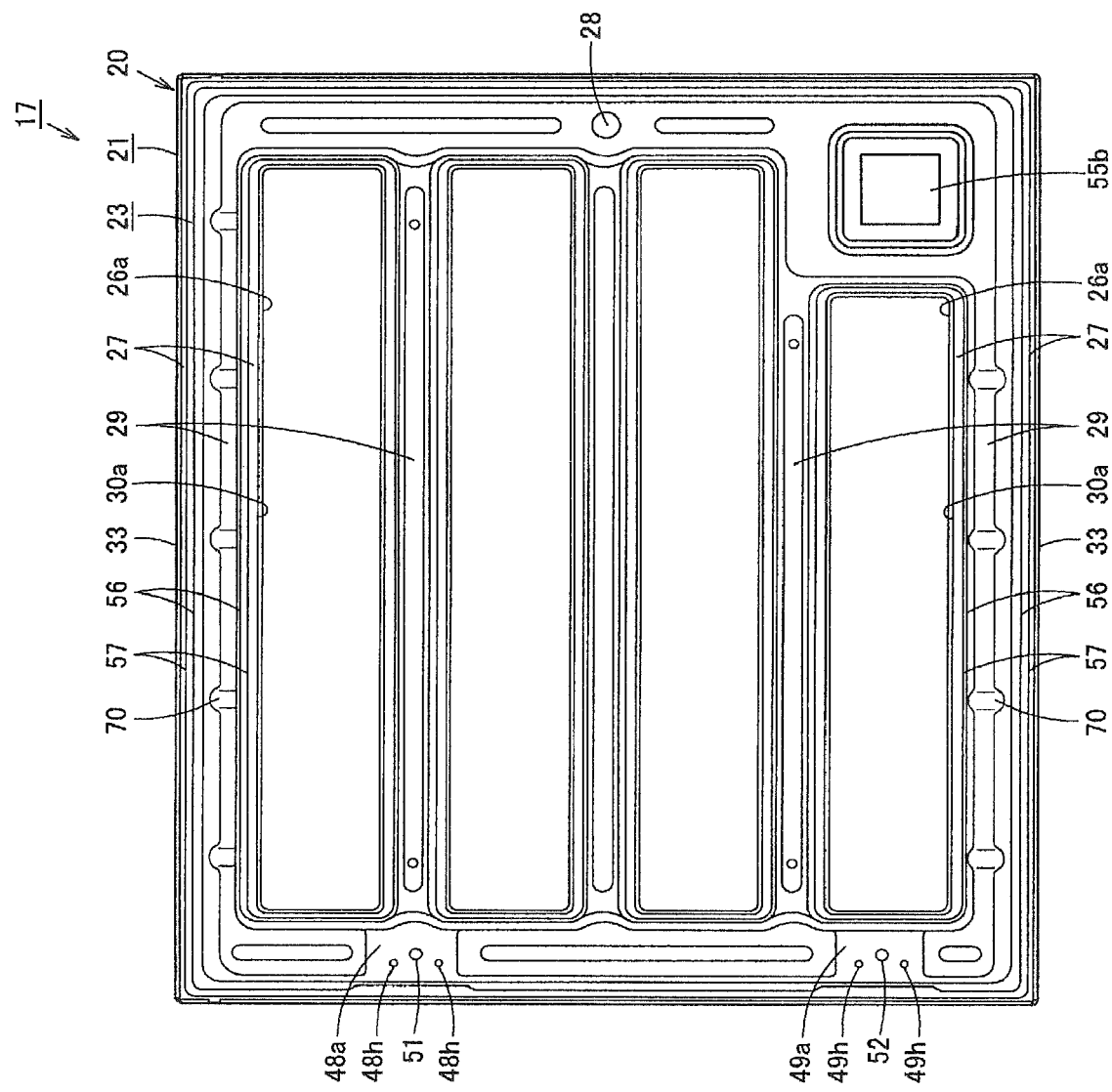
FIG. 27 is an internal view of the door panel.

Next, the present invention is explained in detail hereunder, referring to an embodiment thereof illustrated in FIGS. 1 to 20, another embodiment thereof illustrated in FIGS. 21 and 22, a further embodiment thereof illustrated in FIGS. 23 to 25, and yet another embodiment thereof illustrated in FIGS. 26 and 27.

FIG. 20 illustrates a hydraulic excavator 10, which is a work machine. The hydraulic excavator 10 includes a lower structure 11, an upper structure 12, a cab 13, a work equipment 14, and a power system 15 that includes an engine. The cab 13, the work equipment 14, and the power system 15 are mounted on the upper structure 12, which is rotatably mounted on the lower structure 11. The power system 15 is covered by a top cover 16, side doors 17, and other such components. Each side door 17 is mounted by hinges, which will be explained later, so as to be capable of opening and closing, and maintained in the closed state by means of a latching device 19 that will be explained later.

Figure 1:
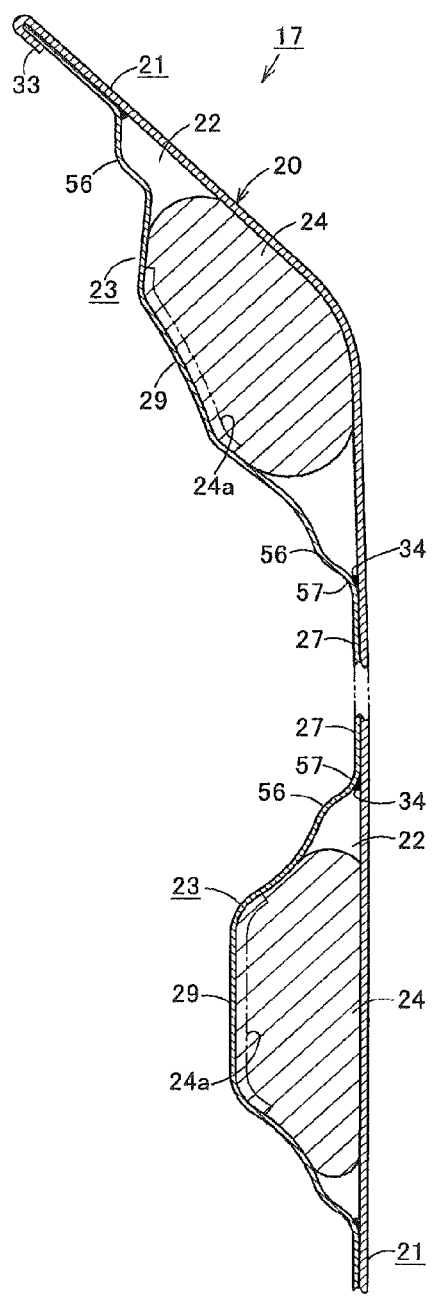
FIG. 1 is a sectional view of a door panel according to an embodiment of the present invention.
Figure 2:
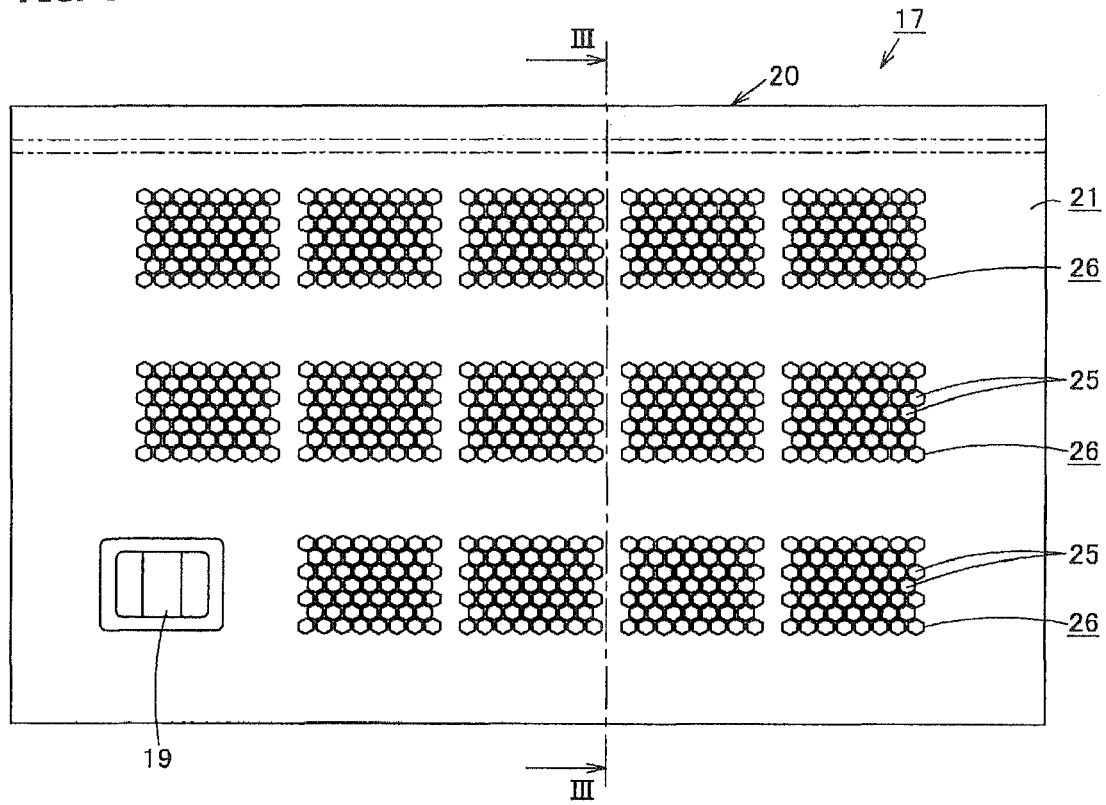
FIG. 2 is an external view of the door panel.
Figure 3:
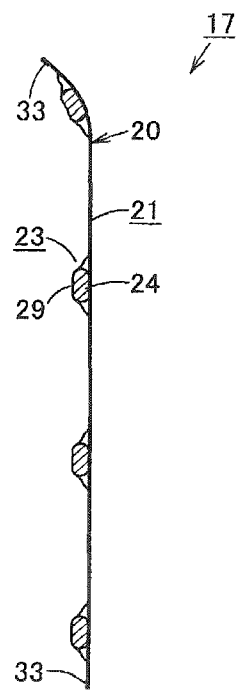
FIG. 3 is a sectional view taken along the line III-III of FIG. 2.

FIGS. 1 to 5 illustrate a door panel 20 of one of the side doors 17. As illustrated in FIGS. 1 and 3, the door panel 20 includes an outer panel 21, an inner panel 23, and a foamed material 24. The inner panel 23 is formed by means of press molding so as to have an uneven surface with recessed portions and raised portions. The recessed portions are fixed to the inner surface of the outer panel 21, and a space 22 is formed between the raised portions and the inner surface of the outer panel 21 and filled with the aforementioned foamed material 24.

The outer panel 21 has a thickness ranging from 1.2 to 5.0 times that of the inner panel 23. In other words, a metal plate, such as an iron plate, a cold-reduced carbon steel sheet (e.g. SPCC), or a galvanized steel sheet, that is thinner than the outer panel 21 is used to form the inner panel 23. For example, if the outer panel 21 is an iron plate, a cold-reduced carbon steel sheet, or a galvanized steel sheet with a thickness of 1.2 mm, it is desirable to use a thin iron plate, a cold-reduced carbon steel sheet, or a galvanized steel sheet with a thickness of, for example, 0.6 or 0.8 mm to form the inner panel 23 in order to obtain sufficient strength and workability, which are reciprocal properties. As such a sheet metal is suitable for a single-press molding, various recessed portions and raised portions explained later are formed by pressing in order to obtain a prescribed strength.

A cold-reduced carbon steel sheet, such as SPCC, is usually used for a conventional side door of a work machine. As a multilayered door of this type presents the possibility of internal anti-corrosion treatment being damaged by dew condensation or other causes, the outer panel 21 and the inner panel 23 are formed of galvanized steel sheet in order to improve the anti-corrosion properties of the interior of the door panel 20.

As illustrated in FIG. 1, the foamed material 24 is formed by heating an unactivated foaming sheet of a foaming material 24a, which is attached to the inner surface of the inner panel 23, so that the heated foaming material 24a is activated and expands inside the space 22 between the outer panel 21 and the inner panel 23. A highly expandable foaming rubber-base sound absorbing material that has an approximately 20-fold volumetric thermal expansion coefficient may desirably be used as the foaming material 24a. It is desirable to conduct the heating of the foaming material 24a during the baking finish process using a baking finish heating apparatus.

Figure 4:
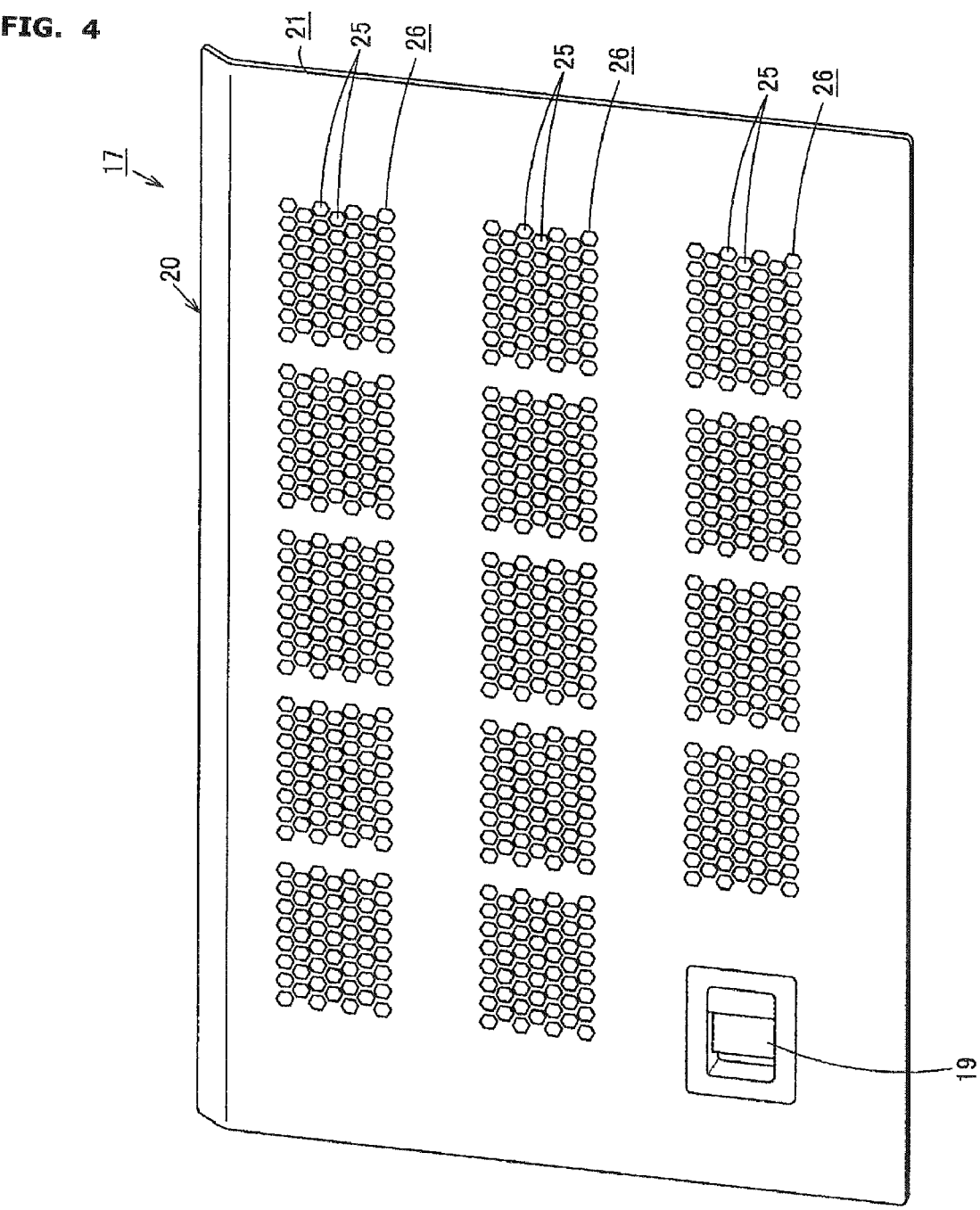
FIG. 4 is a perspective view of the outer face of the door panel.

As illustrated in FIGS. 2 and 4, the outer panel 21 has a plurality of honeycomb ventilation hole sections 26 serving as ventilation hole clusters, each of which comprises a plurality of regular hexagonal ventilation holes 25 that are formed through the material of the outer panel 21 so as to be arranged in a honeycomb pattern.

Figure 5:
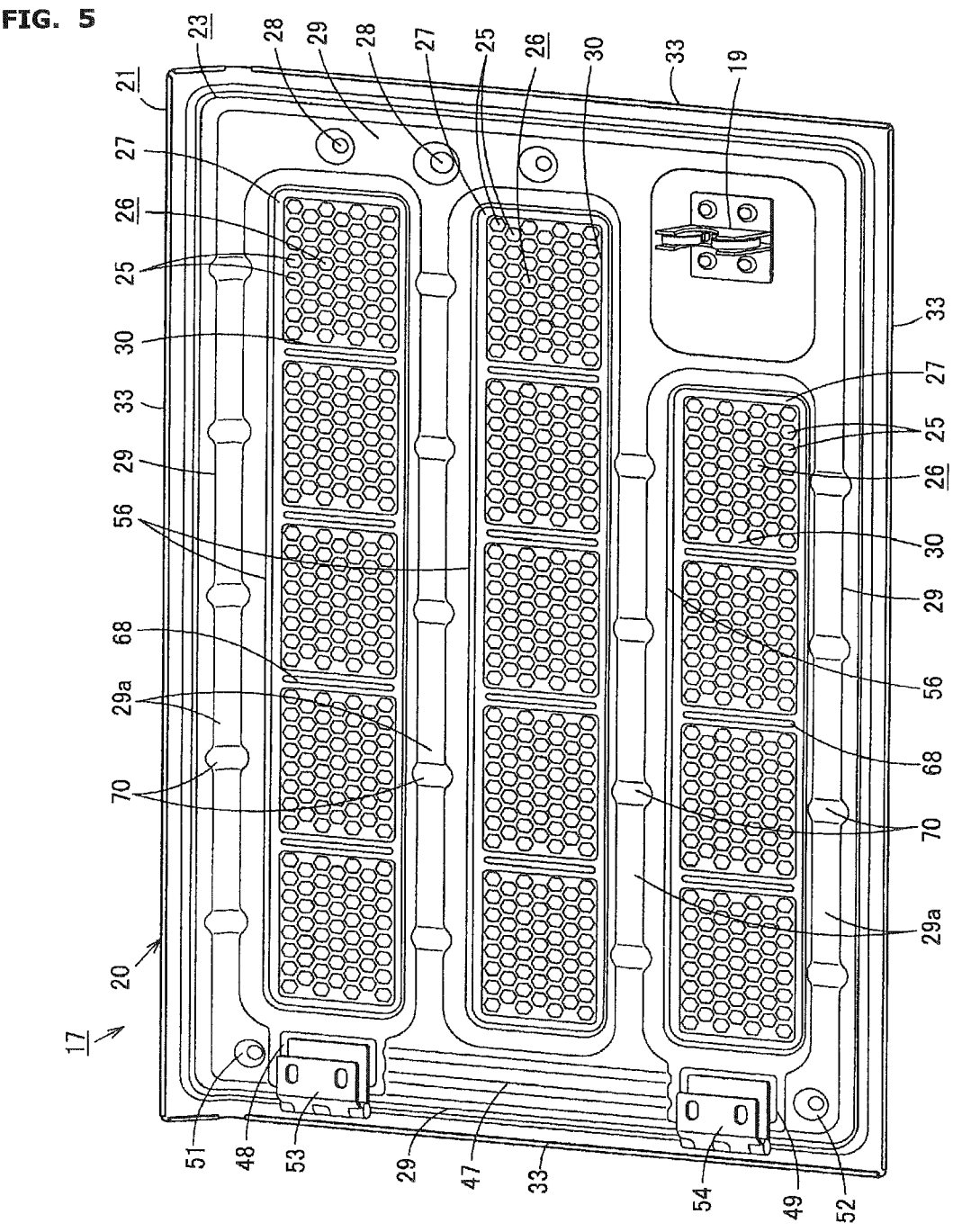
FIG. 5 is a perspective view of the inner face of the door panel.

As illustrated in FIG. 5, the inner panel 23 has adhering portions 27,28, which are the aforementioned recessed portions joined to the inner surface of the outer panel 21, and a raised portion 29 bulging from the adhering portions 27,28.

Of the adhering portions 27 of the inner panel 23, those surrounded by the raised portion 29 comprise three laterally extending rows, which are provided at locations respectively corresponding to the TOWS of the honeycomb ventilation hole sections 26 of the outer panel 21. Each one of these laterally extending adhering portion 27 is provided with ventilation openings 30, each of which is larger than each honeycomb ventilation hole section 26 of the outer panel 21.

To be more specific, a plurality of laterally extending ventilation openings 30 are formed in the adhering portions 27 that are surrounded by the raised portion 29 and serve as a part of the recessed portions of the inner panel 23. Each ventilation opening 30 corresponds to and is slightly larger than each respective honeycomb ventilation hole section 26 of the outer panel 21.

Figure 6:
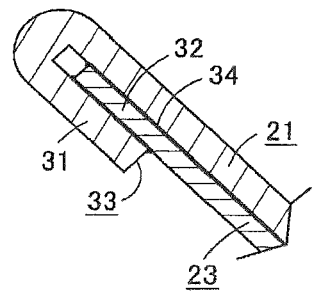
FIG. 6 is a sectional view of a hemmed portion of the door panel.
Figure 7:
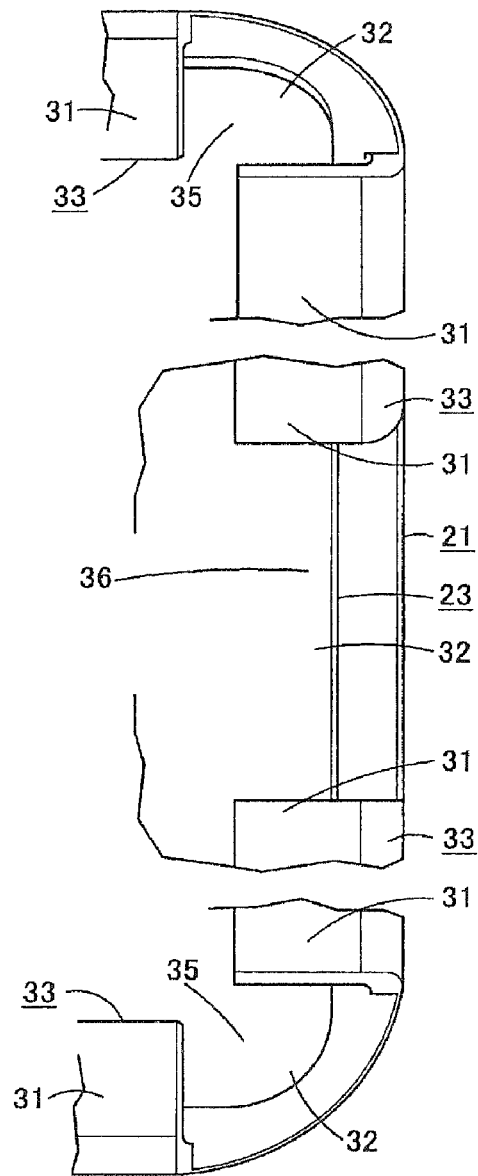
FIG. 7 is an internal view of the hemmed portion of the door panel.
Figure 8:
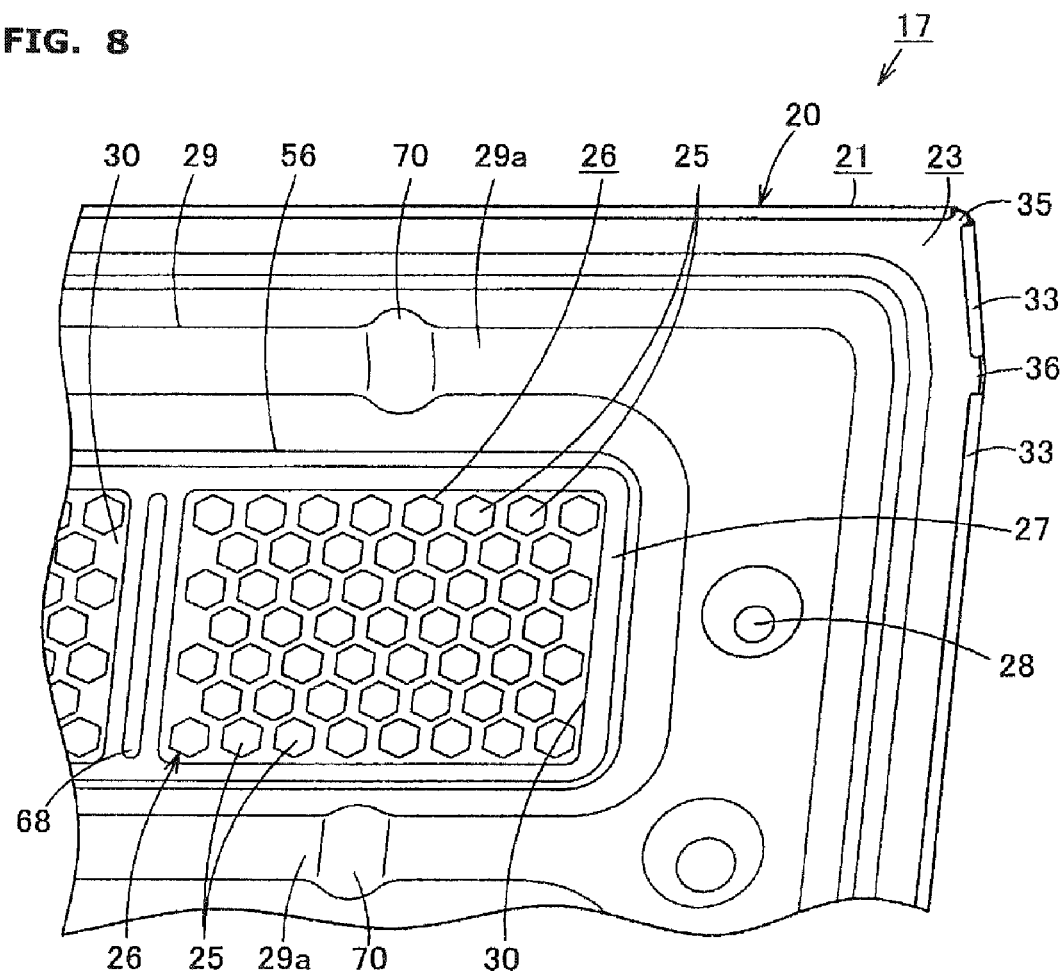
FIG. 8 is an enlarged perspective view of the inner face of the door panel.

As illustrated in FIGS. 6 to 8, the peripheral edge 31 of the outer panel 21 is hemmed by folding the peripheral edge 31 of the outer panel 21 so as to curl over the peripheral edge 32 of the inner panel 23 and then pressing down the folded part. In other words, the outer panel 21 has a hemmed portion 33 that is formed by folding the peripheral edge 31 of the outer panel 21 so as to curl over the peripheral edge 32 of the inner panel 23 and then pressing down the folded part substantially flat so that the peripheral edge 31 of the outer panel 21 interlockingly secures the peripheral edge 32 of the inner panel 23.

As illustrated in FIG. 6, at least the peripheral edge 32 of the inner panel 23 is bonded to the outer panel 21 with an adhesive 34, which joins as well as seals the outer panel 21 and the inner panel 23 together at the hemmed portion 33. The adhesive 34 may desirably be a paste-type structural adhesive having both viscous and thermosetting properties.

As illustrated in FIGS. 7 and 8, the peripheral edge 31 of the outer panel 21 is provided with corner notches 35 and intermittent folded portion notches 36, each of which is formed by partially cutting away the folded part of a corner or an intermittent folded portion of the peripheral edge 31, respectively. The corner portions of the inner panel 23 that correspond to the corner notches 35 of the outer panel 21 are rounded.

Figure 9:
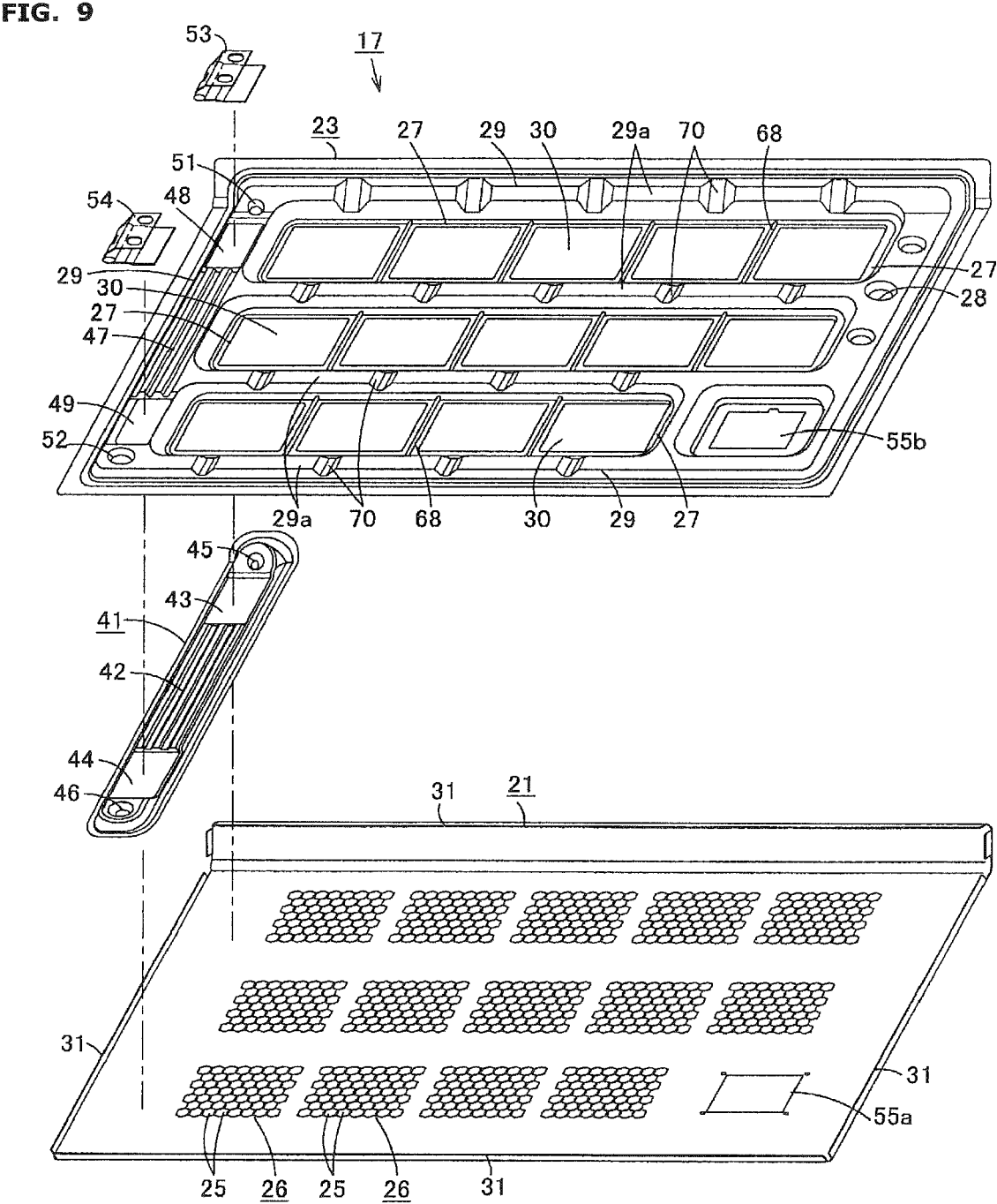
FIG. 9 is an exploded perspective view of the door panel.

FIG. 9 is an exploded perspective view of the side door 17, illustrating how an internal reinforcing plate 41 for mounting hinges is affixed. To be more specific, the internal reinforcing plate 41 is sandwiched between the outer panel 21 and the inner panel 23 in the state where the inner panel 23 is positioned on and affixed to the inner surface of the outer panel 21.

The internal reinforcing plate 41 is provided at the middle portion thereof with a corrugated adhering portion 42 including alternating ridges and furrows. Hinge mounting surface portions 43,44 are respectively formed continuously with one end and the opposing end of the corrugated adhering portion 42. A positioning fitting portion 45 and a positioning fitting portion 46, both of which have a concave shape, are formed adjacent to the hinge mounting surface portions 43,44, respectively.

At the location corresponding to the internal reinforcing plate 41, the inner panel 23 is provided with a corrugated adhering portion 47 including alternating ridges and furrows. The corrugated adhering portion 47 is formed at the middle part of the hinge-attaching end of the raised portion 29 of the inner panel 23. Hinge mounting openings 48,49 are respectively formed adjacent to one end and the opposing end of the corrugated adhering portion 47. A positioning fitting portion 51 and a positioning fitting portion 52, both of which are in the shape of a protrusion protruding downward, are formed adjacent to the hinge mounting openings 48,49, respectively.

The two positioning fitting portions 45,46 of the internal reinforcing plate 41 have different dimensions, and, correspondingly, the positioning fitting portions 51,52 of the inner panel 23, too, have different dimensions. The positioning fitting portion 45 and the positioning fitting portion 51, which are respectively formed at mutually corresponding locations on the internal reinforcing plate 41 and the inner panel 23, fit to each other in a male-female engagement. The positioning fitting portion 46 and the positioning fitting portion 52, which are respectively formed at another pair of mutually corresponding locations on the internal reinforcing plate 41 and the inner panel 23, fit to each other in a male-female engagement.

When the internal reinforcing plate 41 is positioned on and fitted to the inner panel 23, the corrugated adhering portion 42 of the internal reinforcing plate 41 is brought into direct contact with the reverse surface of the corrugated adhering portion 47 of the inner panel 23, to which an adhesive is applied, and the hinge mounting surface portions 43,44 of the internal reinforcing plate 41 are aligned with the hinge mounting openings 48,49 of the inner panel 23 so that hinges 53,54 can be respectively welded to the hinge mounting surface portions 43,44 of the internal reinforcing plate 41 through the hinge mounting openings 48,49.

As illustrated in FIG. 9, mounting holes 55a,55b for mounting a latching device are formed in the outer panel 21 and the inner panel 23, respectively.

Figure 10:
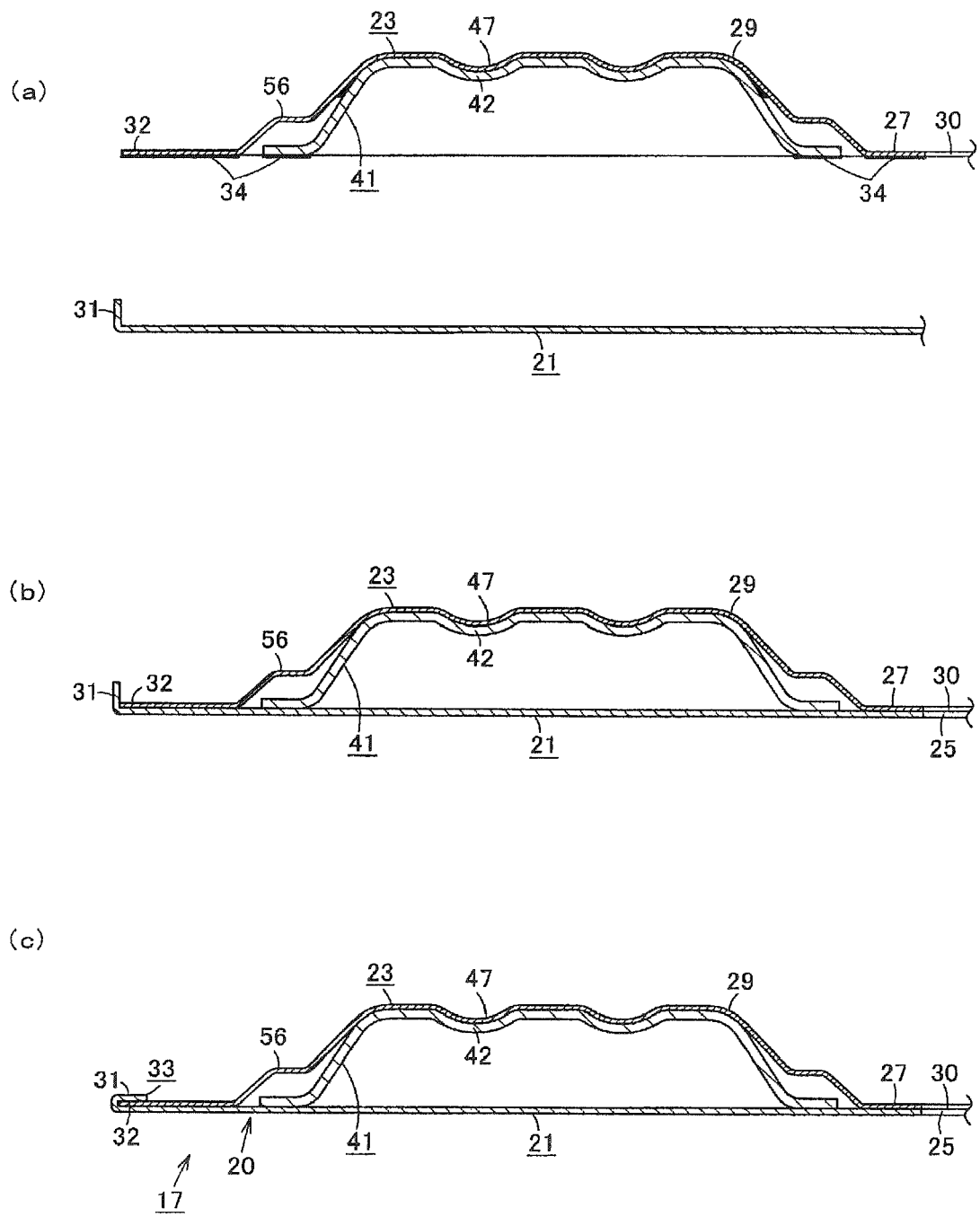
FIG. 10 shows sectional views illustrating the mounting process of an internal reinforcing plate of the door panel, wherein (a) is a sectional view illustrating the internal reinforcing plate positioned in the inner panel and bonded thereto; (b) is a sectional view illustrating how the internal reinforcing plate and the inner panel are positioned in the area surrounded by the peripheral edge of the outer panel in the hemming process; and (c) is a sectional view illustrating how the internal reinforcing plate and the inner panel are immovably joined to the outer panel by hemming the outer panel.

FIG. 10 illustrates a method of producing the door panel 20 incorporating the internal reinforcing plate 41. The inner panel 23 includes the raised portion 29, which is the portion bulging away from the outer panel 21. As illustrated in FIG. 10(a), the internal reinforcing plate 41 is positioned inside the raised portion 29 of the inner panel 23 and bonded thereto by means of the adhesive applied to the corrugated adhering portions 42,47. The adhesive is the thermosetting adhesive 34 and also applied to the joint surfaces of the internal reinforcing plate 41 and the inner panel 23 to be joined to the outer panel 21. As illustrated in FIG. 10(b), in the state where peripheral edge 31 of the outer panel 21 is folded but still open as the hemming process is not yet completed, and the adhesive has been applied to the inner panel 23, the inner panel 23 and the internal reinforcing plate 41 are positioned on the outer panel 21 by fitting the inner panel 23 in the area surrounded by the peripheral edge 31 of the outer panel 21 so that the internal reinforcing plate 41 is sandwiched between the outer panel 21 and the inner panel 23. Then, as illustrated in FIG. 10(c), the inner panel 23 and the internal reinforcing plate 41 are immovably joined to and sealed along the inner surface of the outer panel 21 by hemming the peripheral edge 31 of the outer panel 21 so that the peripheral edge 31 is folded while curling over the peripheral edge 32 of the inner panel 23.

Figure 11:
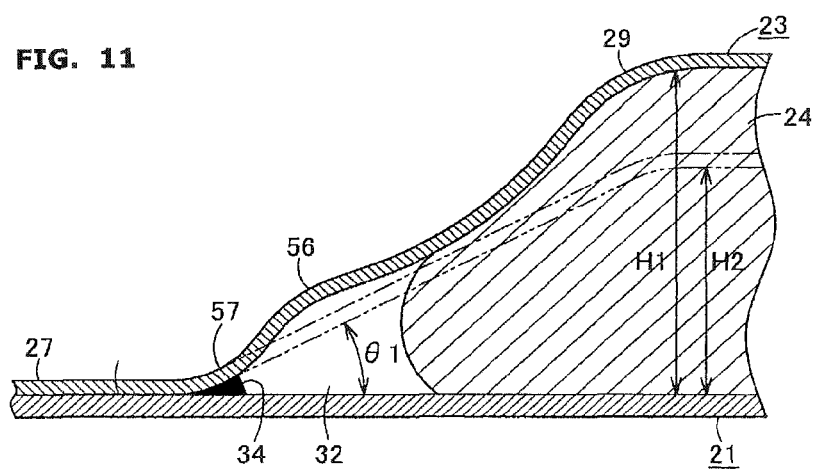
FIG. 11 is a sectional view of a stepped reinforcing deformed portion formed on the inner panel of the door panel.

As illustrated in FIG. 11, the inner panel 23 includes the raised portion 29 bulging from the recessed adhering portions 27, which are in direct contact with the outer panel 21. A reinforcing deformed portion 56 is formed in a step-like shape along the middle of each sloping side of the raised portion 29. The adhering portions 27 of the inner panel 23 are bonded to the outer panel 21 with the adhesive 34. The raised portion 29 has ascending portions 57, each of which has an arc-shaped cross section and continuously extends along the foot of the raised portion 29 rising from the corresponding adhering portion 27.

As illustrated in various drawings including FIGS. 5 and 8, the raised portion 29 and each reinforcing deformed portion 56 are formed in an endless manner along the recessed adhering portions 27.

Figure 12:
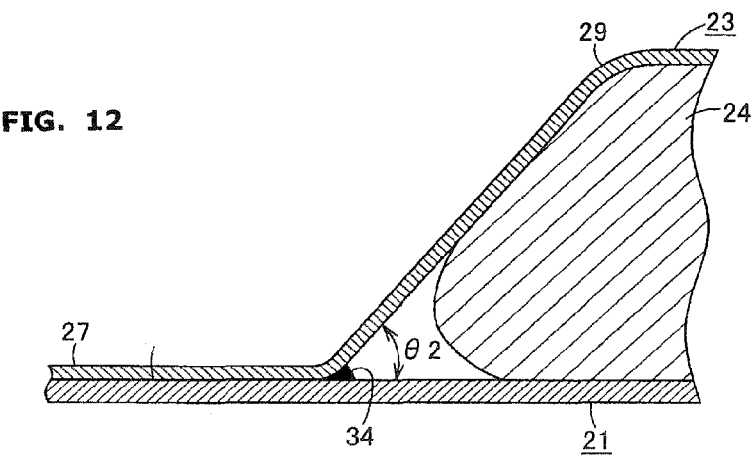
FIG. 12 is a reference drawing for comparison with FIG. 11, illustrating a structure that does not have a stepped reinforcing deformed portion.

FIG. 12 is a reference drawing for comparison with FIG. 11, illustrating a structure that does not have a stepped reinforcing deformed portion 56. In cases where a reinforcing deformed portions 56 enables an arc-shaped ascending portions 57 to be formed as illustrated in FIG. 11, the raised portion 29 rises at a small angle θ1 relative to the outer panel (θ1<θ2). However, the stepped reinforcing deformed portion 56 enables the raised portion 29 to have a sufficient height H1 (H1>H2).

Figure 13:
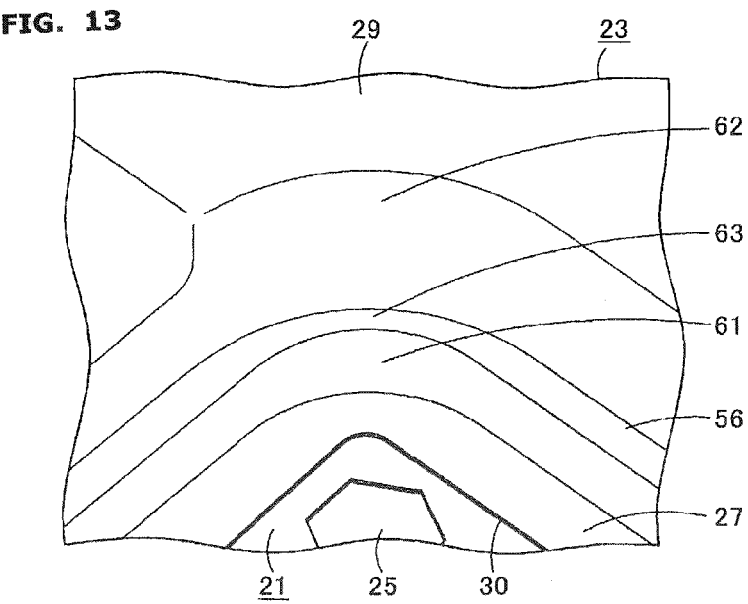
FIG. 13 is a perspective view of a first-stepped corner portion and a second-stepped corner portion, both of which have a shape like a concave surface and are formed on the inner panel of the door panel.

As illustrated in FIG. 13, the raised portion 29 of the inner panel 23 has concave-shaped first-stepped corner portions 61 and concave-shaped second-stepped corner portions 62. Each set of first-stepped corner portion 61 and second-stepped corner portion 62 is located at each respective corner of an adhering portion 27 surrounded by the raised portion 29 with the reinforcing deformed portion 56 that extends along the adhering portion 27 being located between the first-stepped corner portion 61 and the second-stepped corner portion 62. In other words, the first-stepped corner portions 61 is located close to the adhering portion 27 than is the reinforcing deformed portion 56. The raised portion 29 also has non-planar portions 63. Each non-planar portion 63 is provided between each set of first-stepped corner portion 61 and second-stepped corner portion 62 so that the width of the reinforcing deformed portion 56 is smallest at the non-planar portion 63. In other words, at each corresponding non-planar portion 63, the concave surfaces of the first-stepped and second-stepped corner portions 61,62 are closest to each other, without a flat portion therebetween.

Figure 14:
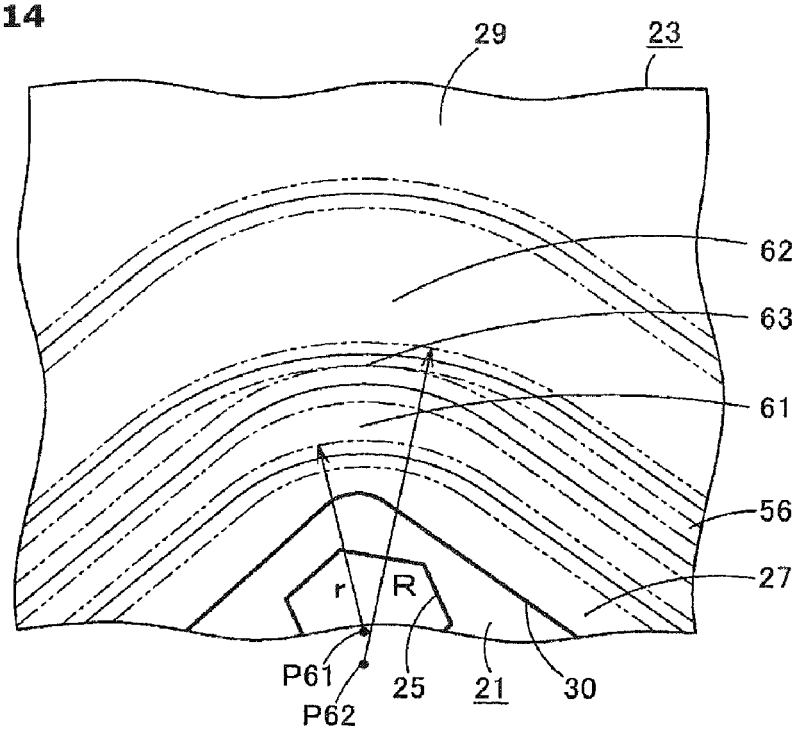
FIG. 14 is a perspective view showing the curvature radiuses and the curvature centers of the concave surfaces of the first-stepped corner portion and the second-stepped corner portion.

In order to form such a non-planar portion 63, it is desirable to set the curvature radius R of the concave surface of the second-stepped corner portion 62 greater than the curvature radius r of the concave surface of the first-stepped corner portion 61 and position the curvature center P62 of the concave surface of the second-stepped corner portion 62 further inside than is the curvature center P61 of the concave surface of the first-stepped corner portion, as illustrated in FIG. 14.

Figure 15:
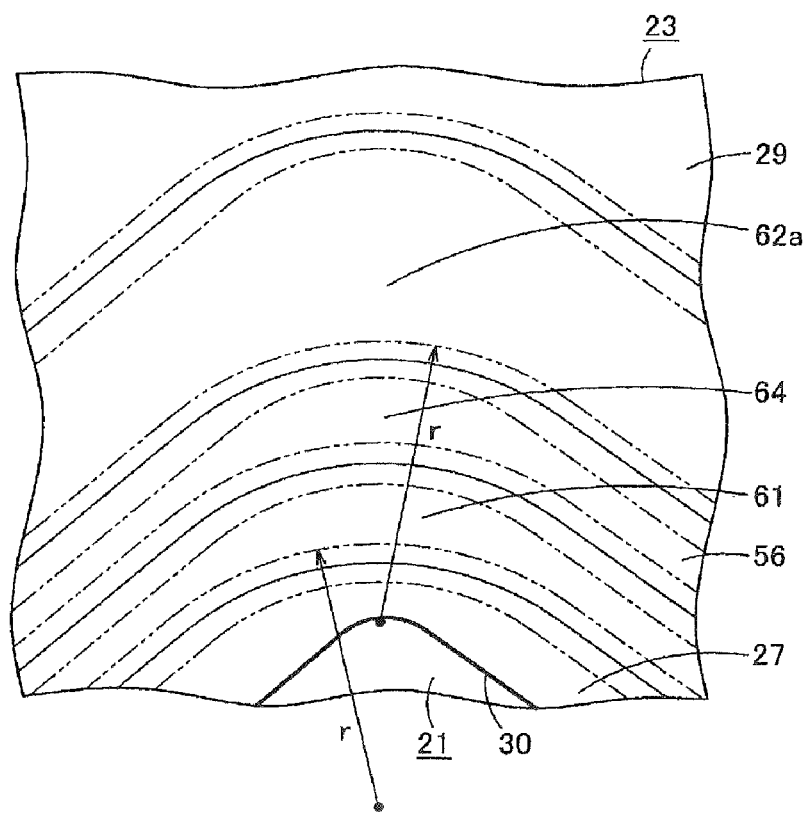
FIG. 15 is a reference perspective view for comparison with FIG. 14, illustrating a structure wherein the concave surfaces of the first-stepped corner portion and the second-stepped corner portion have the same curvature radius.

FIG. 15 is a reference drawing for comparison with FIG. 14. Should the curvature radius r of the concave surface of the second-stepped corner portion 62a be set equal to the curvature radius r of the concave surface of the first-stepped corner portion 61, a flat portion 64, at which the width of the reinforcing deformed portion 56 is greatest, is inevitably formed between the concave surfaces of the first-stepped and second-stepped corner portions 61,62a.

Figure 16:
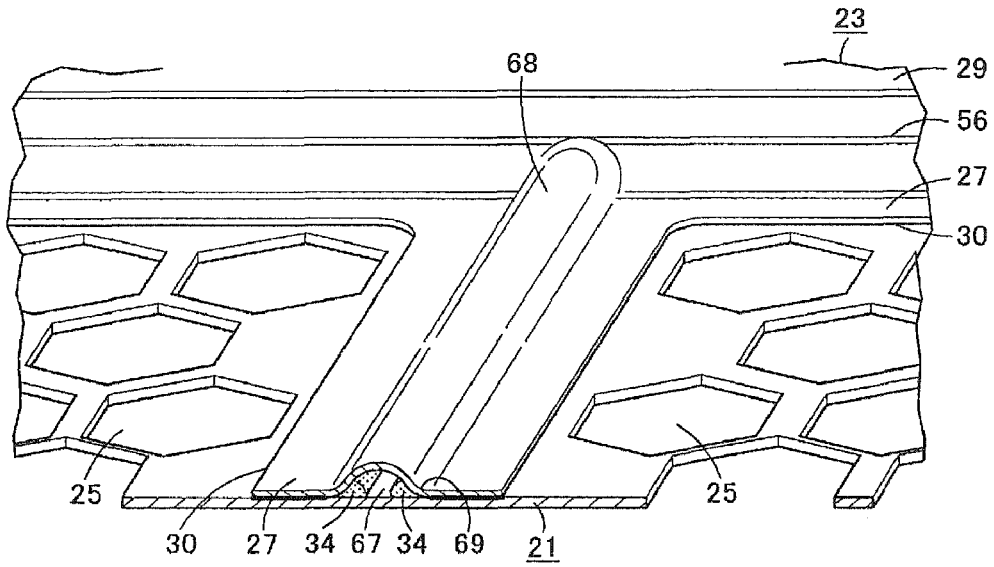
FIG. 16 is a perspective view illustrating an adhesive retaining portion formed in the inner panel of the door panel.

As illustrated in FIG. 16, the adhering portions 27 of the inner panel 23, which are bonded to the outer panel 21 with the adhesive 34, are provided with adhesive retaining portions 68, each of which includes an adhesive retaining channel 67 for retaining the adhesive 34.

The adhesive retaining portions 68 of the inner panel 23 are formed in the shape of an extended raised portion and extend vertically in the adhering portions 27 that are surrounded by the raised portion 29. To be more specific, the ventilation openings 30 are formed at locations corresponding to the locations where the ventilation holes 25 of the outer panel 21 are provided, and the adhesive retaining portions 68 extend vertically between ventilation openings 30.

Figure 17:
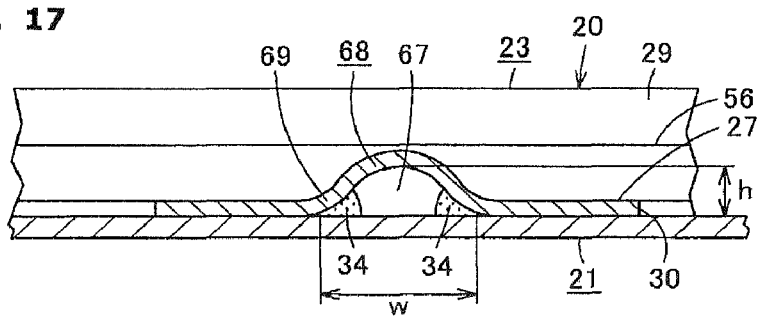
FIG. 17 is a sectional view of the adhesive retaining portion of the door panel.

As illustrated in FIG. 17, the adhesive retaining channel 67 of each adhesive retaining portion 68 has a substantially arc-shaped cross section with dimensions of the height (h) and width (w) being represented by h/w=½ to ¼. In other words, each adhesive retaining portion 68 has rising portions 69 at which the adhesive retaining portion 68 rises from the adhered portion 27. The cross section of each rising portion 69 has a shape of a concave arc.

Figure 18:
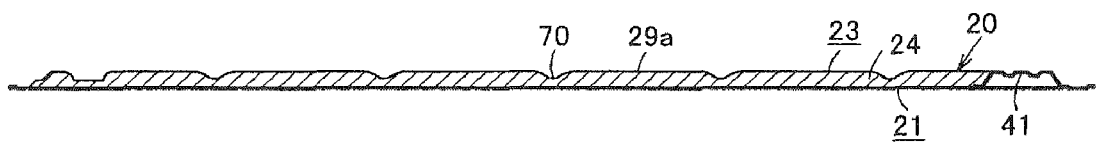
FIG. 18 is a horizontal sectional view of the door panel.

As illustrated in FIG. 5, the raised portion 29 of the inner panel 23 is so formed as to bulge from the adhering portions 27,28. The raised portion 29 has reinforcing raised portions 29a, each of which is a continuously extending raised portion. The reinforcing raised portions 29a are provided at the vertical ends of the rows of ventilation openings 30 and extend along the laterally extending adhering portions 27, which are bonded to the outer panel 21. Furthermore, as illustrated in FIG. 18, reinforcing indentations 70 are formed across the reinforcing raised portions 29a.

Figure 19:
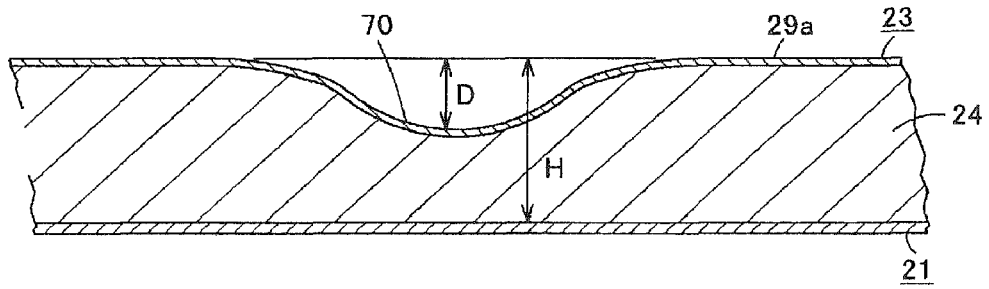
FIG. 19 is an enlarged sectional view of FIG. 18.

As illustrated in FIG. 19, the depth D of each reinforcing indentation 70 is set in the range from ⅓ to ½ of the full height H of the reinforcing raised portions 29a. The space between the outer panel 21 and the reinforcing raised portions 29a of the inner panel 23 is filled with the formed material 24.

Next, a production process of the door panel 20 is explained.

The foaming material 24a is attached to the inner surface of the raised portion 29 of the inner panel 23 as illustrated in FIG. 1, or, although this is not shown in the drawings, to the inner surface of the outer panel 21. As illustrated in FIG. 10(a), the internal reinforcing plate 41 for mounting hinges is joined to the reverse surface of the raised portion 29 of the inner panel 23, at a location in the proximity of one of the lateral ends of the inner panel 23, and the thermosetting adhesive 34, which is necessary for bonding the outer panel 21 thereto, is applied to the adhering portions 27, which serve as a part of the recessed portions of the inner panel 23, as well as to the internal reinforcing plate 41. As illustrated in FIG. 10(b), the outer panel 21 and the inner panel 23 are positioned and layered one on top of the other. As illustrated in FIG. 10(c), the inner panel 23 and the internal reinforcing plate 41 are joined to the inner surface of the outer panel 21 by hemming the peripheral edge 31 of the outer panel 21 so that the peripheral edge 31 is folded while curling over the peripheral edge 32 of the inner panel 23 and the folded parts are pressed down substantially flat.

Thereafter, the inner panel 23 and the internal reinforcing plate 41 are bonded to the outer panel 21 by heating the adhesive 34 using the baking finish heating apparatus to harden the adhesive 34. Then, as illustrated in FIG. 1, the foaming material 24a is expanded to fill the space 22 with the foamed material 24 by heating using the baking finish heating apparatus. Furthermore, the paint that has been sprayed beforehand onto the outer surface of the outer and inner panels 21,23 is baked thereon by heating using the baking finish heating apparatus.

For example, thermal hardening of the adhesive 34 is conducted by heating for 5 minutes at 150° C.; formation of the foamed material 24 by expansion by heating for 20 minutes at 150° C.; and baking finish by heating for 20 minutes at 180° C.~200° C. Such heating can be performed by using a conventional baking finish heating apparatus.

Finally, as illustrated in FIG. 5, hinges 53,54 are respectively welded to the hinge mounting surface portions 43,44 of the internal reinforcing plate 41 through the hinge mounting openings 48,49 of the inner panel 23 by fillet welding or other appropriate method, and a latching device 19 is attached to the mounting holes 55a of the outer panel 21 and the mounting holes 55b of the inner panel 23.

Next, the functions and effects of the embodiment illustrated in FIGS. 1 to 20 are explained hereunder.

As illustrated in FIG. 1, the hollow structure with a closed cross section formed of the outer panel 21 and the inner panel 23, which is thinner than the outer panel 21, can make the entire door panel 20 lighter. Furthermore, as the closed cross section of this hollow structure has sufficient height, being formed of the inner panel 23 and the outer panel 21 with a thickness greater than that of the inner panel 23, i.e. 1.2 to 5.0 times thicker than the inner panel 23, the door panel has sufficient strength against an external impact. Therefore, the embodiment provides a door panel that is light in weight and has sufficient strength at inexpensive cost.

Furthermore, the foamed material 24 filling the space between the outer panel 21 and the inner panel 23 is capable of absorbing sound and thereby effectively damping sound generated from the door panel itself and, consequently, provides high damping effect to reduce noise.

As illustrated in FIGS. 3 and 5, the inner panel 23 includes recessed adhering portions 27 and a raised portion 29 bulging from the adhering portions 27. Therefore, because of the uneven surface structure formed of the adhering portions 27 and the raised portion 29, the inner panel 23 has increased rigidity and, consequently, increased strength, in spite of being thinner than the outer panel 21.

As illustrated in FIGS. 6 and 7, the hemmed portion is formed by folding the peripheral edge 31 of the outer panel 21 so as to curl over the peripheral edge 32 of the inner panel 23 and then pressing down the folded part. Therefore, even with the outer panel 21 that is thicker than the inner panel 23, the embodiment is capable of providing a hemmed portion 33 with a uniform shape, and thereby providing a folded joint portion having stable quality.

In other words, the hemmed portion 33, at which the peripheral edge of the outer panel 21 interlockingly secures the peripheral edge of the inner panel 23, is formed by folding the peripheral edge of the outer panel 21 so as to curl over the peripheral edge of the inner panel 23 and then pressing down the folded part flat. Therefore, compared with a conventional hemming in which the folded part of the outer panel 21 protrudes in a circular cross section, the hemmed portion 33 of the outer panel 21 results in a stable shape and ensures uniform quality.

In a hemming process, it is not easy to fold the peripheral edge of the outer panel 21 at a corner or an intermittent folded portion of the outer panel 21. According to the present embodiment, however, as illustrated in FIGS. 7 and 8, the outer panel 21 is provided with corner notches 35 and intermittent folded portion notches 36, each of which is formed by partially cutting away the folded part of a corner or an intermittent folded portion of the peripheral edge 31, respectively. Because of these notches, the peripheral edge 31 of the outer panel 21 can be folded and pressed down flat easily and precisely even at the corners and the intermittent folded portions of the outer panel 21.

As illustrated in FIG. 6, the outer panel 21 and the inner panel 23 can reliably be conjoined by means of bonding with the adhesive 34 and the hemmed portion 33 of the outer panel 21.

As illustrated in FIG. 7, the corner portions of the inner panel 23 that correspond to the corner notches 35 of the outer panel 21 are rounded so that the corner portions of the inner panel 23 are prevented from protruding from the corner notches 35 of the outer panel 21.

As illustrated in FIG. 8, each ventilation opening 30 of the inner panel 23 is larger than each respective honeycomb ventilation hole section 26 of the outer panel 21. Therefore, when the inner panel 23 is conjoined with the inner surface of the outer panel 21, the inner panel 23 is prevented from closing off the honeycomb ventilation hole sections 26 of the outer panel 21 regardless of the dimensional tolerance arising from production of the outer panel 21 and the inner panel 23; in other words, even if the outer panel 21 and the inner panel 23 are not precisely positioned with respect to each other due to dimensional discrepancy resulting from shape tolerance of the press molded products, the honeycomb ventilation hole sections 26 of the outer panel 21 shift only within the range of the respective ventilation openings 30. Therefore, by thus preventing interference with the ventilation aperture area of the outer panel 21 and the inner panel 23, this configuration ensures a prescribed aperture area, and, furthermore, facilitates positioning of the outer panel 21 and the inner panel 23, thereby increasing working efficiency in the manufacturing process.

The plurality of sets of honeycomb ventilation hole sections 26 and ventilation openings 30 ensures a sufficient aperture area for ventilation.

As a result of the configuration described above, for a door panel with a double-panel structure having an outer panel 21 and an inner panel 23, by grouping ventilation holes 25 so as to form densely arranged honeycomb-shaped apertures in the outer panel 21, honeycomb ventilation hole sections 26 with a high aperture area efficiency can be formed at locations respectively corresponding to the limited spaces of the ventilation openings 30 in the inner panel 23. Furthermore, as each honeycomb ventilation hole section 26 is formed by arranging a plurality of regular hexagonal ventilation holes 25 in a honeycomb pattern so that each side of each respective ventilation hole 25 is adjacent to a side of another ventilation hole 25 with a connecting portion therebetween, it is possible to reduce fluid resistance by making the connecting portions between the ventilation holes 25 narrow, while ensuring sufficient strength of these connecting portions. As a result, compared with ventilation hole clusters that are formed of grouped circular or square holes, turbulent flow generated by obstruction of airflow by the connecting portions between the ventilation holes 25 can be reduced.

As illustrated in FIG. 9, as the internal reinforcing plate 41 provided in the raised portion 29, which is the portion of the inner panel 23 raised away from the outer panel 21, is secured between the inner panel 23 and the outer panel 21, the inner panel 23 is reinforced at the raised portion 29 by the internal reinforcing plate 41. A particular feature lies in that the internal reinforcing plate 41 is immovably positioned with respect to the inner panel 23 in a male-female engagement. Therefore, as merely fitting the internal reinforcing plate 41 to the inner panel 23 in a male-female engagement during the production process is sufficient to precisely control the position of the internal reinforcing plate 41, the internal reinforcing plate 41 can precisely be positioned and fixed to a location where reinforcement is most effective.

To be more specific, a male-female engagement of a pair of positioning fitting portions 45,51 and a male-female engagement of another pair of positioning fitting portions 46,52 enable the internal reinforcing plate 41, which has an elongated shape, to be easily and securely positioned to the inner panel 23.

The pair of positioning fitting portions 45,51 differs from the other pair of positioning fitting portions 46,52 in its dimensions. Therefore, should the internal reinforcing plate 41 be position in a wrong orientation, it is impossible to align the positioning fitting portions 45,46 of the internal reinforcing plate 41 with the positioning fitting portions 51,52 of the inner panel 23. This feature ensures the internal reinforcing plate 41, which has a prescribed orientation, to be properly installed in the inner panel 23.

As the hinges 53,54 are respectively welded to the hinge mounting surface portions 43,44 of the internal reinforcing plate 41 through the hinge mounting openings 48,49, which are formed in the inner panel 23, the hinges 53,54 are more solidly affixed, compared with cases where the hinges 53,54 are mounted on the inner panel 23.

As illustrated in FIG. 10, in the state where the peripheral edge 31 of the outer panel 21 is folded but still open as the hemming process is not yet completed, and the adhesive has been applied to the inner panel 23, the inner panel 23 and the internal reinforcing plate 41 are positioned on the outer panel 21 by fitting the inner panel 23 in the area surrounded by the peripheral edge 31 of the outer panel 21, with the internal reinforcing plate 41 sandwiched between the outer panel 21 and the inner panel 23. Then, the inner panel 23 and the internal reinforcing plate 41 are secured to the inner surface of the outer panel 21 by hemming the peripheral edge 31 of the outer panel 21 so that the peripheral edge 31 is folded while curling over the peripheral edge 32 of the inner panel 23. This configuration can provide a door panel production method that ensures, by means of the internal reinforcing plate 41, that the inner panel 23, which is formed in an uneven surface protruding away from and recessed towards the outer panel 21, has sufficient strength at its raised portion 29, while making effective use of the peripheral edge 31 of the outer panel 21 for positioning the inner panel 23 when the hemming process is not yet completed.

As illustrated in FIG. 11, the hollow structure with a closed cross section formed of the outer panel 21 and the inner panel 23 ensures sufficient strength. Furthermore, the inner panel 23 includes the raised portion 29 bulging from the adhering portions 27, which are in direct contact with the outer panel 21. A stepped reinforcing deformed portion 56 is formed along the middle of each sloping side of the raised portion 29. Therefore, the strength of the inner panel 23 is further increased compared with a door panel that is merely provided with a raised portion 29 as illustrated in FIG. 12, resulting in further improvement of the strength of the entire door panel.

By gaining the height H1 of the raised portion 29 by means of the stepped reinforcing deformed portions 56, the configuration according to the embodiment structurally increases the strength of the door panel, because the geometric moment of inertia relative to the direction of the load is proportional to the height H1 cubed. Furthermore, at each arc-shaped ascending portion 57, which is formed at the raised portion 29 as an integral, continuous body with the adjacent adhering portion 27 so as to rise as an arc therefrom, it is also possible to set the angle θ1 relative to the outer panel 21 to be smaller than the angle θ2 illustrated in FIG. 12. Therefore, even if a surplus of the adhesive 34 that is generated during bonding of the adhered portions 27 of the inner panel 23 to the outer panel 21 moves into the raised portion 29, the adhesive 34 can be retained in the space having a sufficient height between the ascending portion 57 of the raised portion 29 and the outer panel 21 and prevented from further spreading into the raised portion 29. In addition, the solidified surplus adhesive 34 that is retained in sufficient thickness increases the adhering strength of the inner panel 23 to the outer panel 21.

As illustrated in FIG. 5, the adhering portions 27, and the raised portion 29 and the reinforcing deformed portions 56, which are formed in an endless manner along the adhering portions 27, reinforce each other and thereby increase the strength of the entire inner panel 23.

As illustrated in FIGS. 13 and 14, the inner panel 23 includes the reinforcing deformed portions 56 formed in a step-like shape. Each reinforcing deformed portion 56 is formed along the middle of each sloping side of the raised portion 29 bulging from the recessed adhering portions 27, which are in direct contact with the outer panel 21. This configuration solves the problem of discontinuity resulting from such a structure as the one illustrated in FIG. 15, wherein the concave surface of the first-stepped corner portion 61 and the concave surface of the second-stepped corner portion 62*a* are separated by the flat portion 64. As a result of the structure according to the embodiment, press-moldability of the corner portions is improved, because, when the inner panel 23 is formed by pressing a sheet metal material affixed at the peripheral edge, it is easier for the sheet metal material to extend from the concave surface of each first-stepped corner portion 62 to the concave surface of the second-stepped corner portion 61 that is formed continuously with first-stepped corner portion 61, as illustrated in FIG. 14.

As illustrated in FIG. 14, the concave surface of each second-stepped corner portion 62 with the curvature radius R, which is greater than the curvature radius r of the concave surface of each first-stepped corner portion 61, is a surface with an open curve that has a wider arc than that of the concave surface of the first-stepped corner portion 61. Therefore, the sheet metal material extends more smoothly at the second-stepped corner portions 62 than in the case of a structure provided with reinforcing deformed portions 56 with wide flat portions 64, such as the one illustrated in FIG. 15. Furthermore, as the curvature center P62 of the concave surface of each second-stepped corner portion 62 is located further inside than is the curvature center P61 of the concave surface of each first-stepped corner portion 61, the concave surface of the second-stepped corner portion 62 is located close to the concave surface of the first-stepped corner portion 61, enabling the smooth extension of the material from the second-stepped corner portion 62 to the first-stepped corner portion 61 when the inner panel 23 is formed by pressing.

As illustrated in FIGS. 16 and 17, the adhering portions 27 of the inner panel 23, which are bonded to the outer panel 21 with the adhesive 34, are provided with adhesive retaining portions 68, each of which includes an adhesive retaining channel 67 for retaining the adhesive 34. When the inner panel 23 is pressed against the outer panel 21, the adhesive 34 forced out from between the outer panel 21 and the adhering portions 27 of the inner panel 23 remains in the adhesive retaining channels 67 of the adhesive retaining portions 68. Therefore, when the adhesive 34 hardens, the adhering strength of the adhesive 34 is maintained.

In cases where the door panel 20 is used as a side door, the adhesive retaining portions 68, which extend vertically in the adhering portions 27 that are surrounded by the raised portion 29, also serve as vertically extending columns and thereby increase the strength of the door panel 20 to withstand a vertical load.

In cases where the inner panel 23 is provided with ventilation openings 30 at locations corresponding to the ventilation holes 25 of the outer panel 21 in order to withstand severe heat, the adhesive can be retained in the adhesive retaining portions 68, which are formed in the shape of an extended raised portion and extend vertically between the ventilation openings 30 in the adhering portions 27 that are surrounded by the raised portion 29. Therefore, as adhering strength of the adhesive 34 is maintained in spite of a limited adhering area, increased strength is ensured. The adhesive retaining portions 68, which are formed in the shape of an extended raised portion and extend vertically between the ventilation openings 30 in the adhering portions 27 that are surrounded by the raised portion 29, also increase the strength of the adhering portions 27 and thereby prevent reduction of the strength around the ventilation openings 30.

As each adhesive retaining channel 67, which has a substantially arc-shaped cross section with dimensions of the height (h) and width (w) being represented by h/w=½ to ¼, is a flattened space with a limited height, the adhesive 34 that has been forced out from between the outer panel 21 and the adhering portions 27 of the inner panel 23 into the adhesive retaining channels 67 remains where it has been forced and becomes solidified therein. Therefore, adhering strength of the adhesive 34 is maintained.

As illustrated in FIG. 17, each rising portion 69 of each adhesive retaining portion 68 has a cross section in the shape of a concave arc, and a slight gap that gradually becomes wider is formed between the outer panel 21 and each rising portion 69 of each adhesive retaining portion 68. As the adhesive 34 readily remains in these gaps formed by the rising portions 69, adhering strength of the adhesive 34 is maintained.

As illustrated in FIG. 5, the inner panel 23 includes the adhering portions 27, which are bonded to the outer panel 21. As illustrated in FIG. 18, the reinforcing raised portions 29*a*, each of which is a continuously extending raised portion, extend along the adhering portions 27. While these reinforcing raised portions 29*a* have a reinforcing function to increase the strength of the inner panel 23 bonded to the outer panel 21, the reinforcing indentations 70, which are indentations formed across the reinforcing raised portions 29*a*, further enhance the reinforcing function of the reinforcing raised portions 29*a*. In short, by providing the inner panel 23 with a complicated uneven shape with the reinforcing raised portions 29*a* and the reinforcing indentations 70, which extend in a direction intersecting the direction in which the reinforcing raised portions 29*a* extend, the inner panel 23 can be further reinforced.

As illustrated in FIG. 19, limiting the depth D of each reinforcing indentation 70 to not less than ⅓ of the full height H of the reinforcing raised portion 29*a* prevents formation defect of the reinforcing indentations 70, such as spring back, which may occur during press molding should the reinforcing indentations 70 be too shallow. Limiting the depth D of each reinforcing indentation 70 to not greater than ½ of the full height H of the reinforcing raised portion 29*a* prevents formation strength deterioration that may occur should the reinforcing indentations 70 be too deep.

As the reinforcing indentations 70 with the depth D limited in the range of ⅓ to ½ of the full height H of the reinforcing raised portion 29*a* do not completely partition the reinforcing raised portion 29*a*, the foamed material 24 that is formed in one continuous body can easily be provided along the entire length of the reinforcing raised portion 29*a*.

Next, FIGS. 21 and 22 illustrate another embodiment of the present invention. In short, the embodiment relates to a side door 17 that has neither honeycomb ventilation hole sections 26 of the outer panel 21 nor ventilation openings 30 of the inner panel 23. In the case of the above embodiment illustrated in FIGS. 1 to 20, the honeycomb ventilation hole sections 26 of the outer panel 21 and the ventilation openings 30 of the inner panel 23 are provided in order to withstand severe heat. According to this embodiment, the strength of the side door 17 is increased, because the adhering portions 27 of the inner panel 23 are bonded to the reverse surface of the outer panel 21 over a wide area. As the other components and elements are similar to those of the embodiment illustrated in FIGS. 1 to 20, they are identified with the same reference numerals, and their explanation is omitted herein.

Next, FIGS. 23 to 25 illustrate a further embodiment of the present invention. In short, the embodiment relates to a side door 17 that does not have a stepped reinforcing deformed portion 56, which is provided in the case of the embodiments illustrated in FIGS. 1 to 22. As the other components and elements are similar to those of the embodiments illustrated in FIGS. 1 to 22, they are identified with the same reference numerals, and their explanation is omitted herein.

Next, FIGS. 26 and 27 illustrate yet another embodiment of the present invention. In short, the embodiment relates to a side door 17 of which the stepped reinforcing deformed portion 56 that extends along the hemmed portion 33 is formed close to the hemmed portion 33, as opposed to the aforementioned embodiment. The other features of the reinforcing deformed portion 56 are similar to those of the embodiments illustrated in FIGS. 1 to 22.

To be more specific, a multilayered side door 17 for a work machine, such as the side door 17 of the embodiment illustrated in FIGS. 23 to 25, is formed by bonding the outer edges of the panels with the adhesive 34 and joined by bending by hemming (hereinafter referred to as "hem-bending") the peripheral edge of the outer panel 21. In order to ensure a sufficient adhering area at the portion that undergoes hem-bending, the ascending portion of the raised portion 29 that extends along the hemmed portion 33 is provided at a sufficient distance apart from the hemmed portion 33. However, it has become apparent that a structure with adhering portions 27 that are free from the hemmed portion 33, in other words a structure having a substantially large area where two panels are merely bonded together with an adhesive 34 without becoming thick, makes it difficult to ensure accuracy in the shape, because such a structure is prone to warping of the peripheral edge resulting from deformation caused by shrinkage of the adhesive 34 or change in temperature.

Therefore, as illustrated in FIG. 26, the inner panel 23 is provided with a reinforcing deformed portion 56 formed adjacent to the adhering portion 27 that is formed at a location corresponding to the hemmed portion 33 of the outer panel 21 and adapted to be bonded, by means of the adhesive 34, to the outer panel 21 so that the reinforcing deformed portion 56 rises from a location close to the hemmed portion. In short, the reinforcing deformed portion 56 reaches a location adjacent to the edge of the folded part of the hemmed portion 33, providing the side door 17 with sufficient thickness.

As a result of the structure described above, wherein a bulky reinforcing deformed portion 56 like a column or beam is formed so as to protrude from a location close to the hemmed portion 33 of the outer panel 21, which has substantial strength with a bending length of nearly 10 mm, it is possible to minimize the area where two panels are merely bonded together with the adhesive 34 and not made into a thick structure, such as the area of the adhering portions 27 that are free from the hemmed portion 33. As a result, it is possible to minimize deformation caused by shrinkage of the adhesive 34 or change in temperature. Furthermore, this structure is also capable of ensuring accuracy in the shape by preventing warping of the edge of the door panel 20.

Furthermore, as illustrated in FIG. 27, the side door 17 according to another embodiment is designed to withstand severe heat, as ventilation openings 26*a* of the outer panel 21 and ventilation openings 30*a*, which are formed in the adhering portions 27 of the inner panel 23 that are surrounded by the raised portion 29, are large openings that laterally extend from one side to the other side of each respective panel 21,23.

Furthermore, an internal reinforcing plate (not illustrated) is provided between the outer panel 21 and the inner panel 23. Hinge mounting portions 48a,49a are provided at one of the lateral ends of a frame portion of the side door 17. Each hinge mounting hole portion 48a or 49a is provided with a pair of hinge mounting holes 48h or 49h so that a hinge (not illustrated) can be placed on the corresponding hinge mounting portion 48a or 49a and attached to the internal reinforcing plate by means of bolts inserted through the corresponding hinge mounting holes 48h or 49h. These bolts are screwed in back nuts (not illustrated) welded to the internal reinforcing plate.

Figure 28:
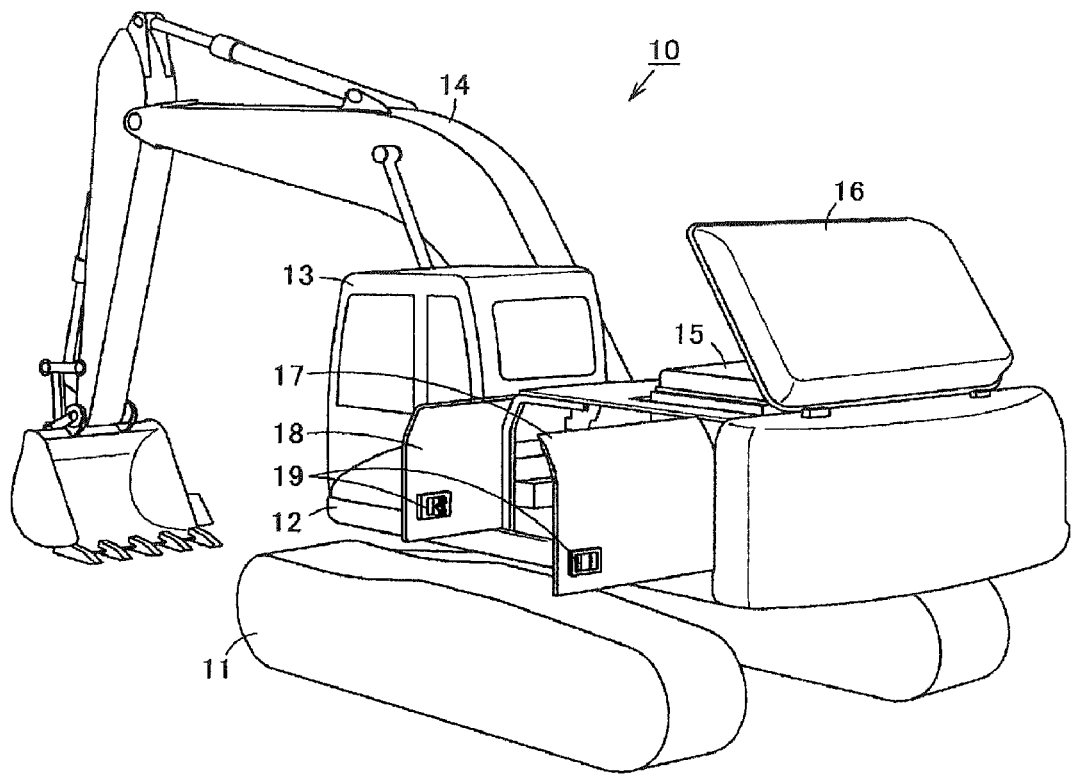
FIG. 28 is a perspective view for schematically illustrating a work machine.

The present invention is applicable to a door panel of a work machine, such as a hydraulic excavator illustrated in FIG. 20 or FIG. 28.

The invention claimed is:

1. A door panel comprising:
    an outer panel;
    an inner panel that is thinner than the outer panel and affixed to the inner surface of the outer panel so that a space is formed between the outer panel and the inner panel; and
    a foamed material filling the space between the outer panel and the inner panel;
    wherein the outer panel comprises a hemmed portion formed by folding the peripheral edge of the outer panel so as to curl over the peripheral edge of the inner panel and then pressing down the folded part; and
    wherein the inner panel comprises a reinforcing deformed portion formed adjacent to an adhering portion that is formed at a location corresponding to the hemmed portion of the outer panel and adapted to be bonded, by an adhesive, to the outer panel so that the reinforcing deformed portion rises from a location close to the hemmed portion.

2. The door panel as claimed in claim 1, wherein the inner panel further comprises:
    a recessed adhering portion that is joined to the inner surface of the outer panel, and a raised portion bulging from the adhering portion.

3. The door panel as claimed in claim 1, wherein:
    the outer panel has a thickness ranging from 1.2 to 5.0 times that of the inner panel.

4. The door panel as claimed in claim 1, wherein:
    the outer panel and the inner panel are formed by using a galvanized steel sheet.

* * * * *